US012758069B2

(12) United States Patent
Calloway et al.

(10) Patent No.: US 12,758,069 B2
(45) Date of Patent: Oct. 13, 2026

(54) SYSTEM AND METHOD FOR EFFICIENT ENGINE OPERATION

(71) Applicant: Old Dominion Brush Company, Henrico, VA (US)

(72) Inventors: Britt R. Calloway, Midlothian, VA (US); Robert Mayes, Hanover, VA (US); Andrew Nitchie, Henrico, VA (US); Tim Stumph, Midlothian, VA (US); Chris Turner, Aylett, VA (US)

(73) Assignee: Old Dominion Brush Company, Henrico, VA (US)

( * ) Notice: Subject to any disclaimer, the term of this patent is extended or adjusted under 35 U.S.C. 154(b) by 0 days.

(21) Appl. No.: 18/635,551

(22) Filed: Apr. 15, 2024

(65) Prior Publication Data

US 2025/0098919 A1 Mar. 27, 2025

Related U.S. Application Data

(62) Division of application No. 18/048,708, filed on Oct. 21, 2022, now Pat. No. 11,957,298.

(51) Int. Cl.

| | |
|---|---|
| ***A47L 9/00*** | (2006.01) |
| ***A47L 5/22*** | (2006.01) |
| ***A47L 9/24*** | (2006.01) |
| ***A47L 9/28*** | (2006.01) |
| ***B60P 1/60*** | (2006.01) |
| ***B65F 3/02*** | (2006.01) |
| ***E01H 1/00*** | (2006.01) |
| ***E01H 1/08*** | (2006.01) |

(52) U.S. Cl.
CPC ............... *A47L 9/2842* (2013.01); *A47L 5/22* (2013.01); *A47L 9/009* (2013.01); *A47L 9/248* (2013.01); *A47L 9/2805* (2013.01); *A47L 9/2852* (2013.01); *A47L 9/2884* (2013.01); *B60P 1/60* (2013.01); *B65F 3/02* (2013.01); *E01H 1/005* (2013.01); *E01H 1/0836* (2013.01); *B65F 2003/0236* (2013.01); *E01H 2001/0881* (2013.01)

(58) Field of Classification Search
CPC .......... A47L 9/2842; A47L 5/22; A47L 9/009; A47L 9/248; A47L 9/2805; A47L 9/2852; A47L 9/2884; A47L 5/365; A47L 9/2831; A47L 9/2857; B60P 1/60; B65F 3/02; B65F 2003/0236; E01H 1/005; E01H 1/0836; E01H 2001/0881
See application file for complete search history.

(56) References Cited

U.S. PATENT DOCUMENTS

| | | | | |
|---|---|---|---|---|
| 11,035,089 | B1 | 6/2021 | Calloway et al. | |
| 2005/0234595 | A1* | 10/2005 | Tani | A47L 9/2852 700/245 |
| 2023/0414052 | A1* | 12/2023 | McClay | A47L 9/2815 |

FOREIGN PATENT DOCUMENTS

| | | | | |
|---|---|---|---|---|
| WO | WO-2014060939 A1 * | 4/2014 | | E01H 1/005 |

* cited by examiner

*Primary Examiner* — Erin F Bergner
(74) *Attorney, Agent, or Firm* — Sterne, Kessler, Goldstein & Fox P.L.L.C.

(57) ABSTRACT

A material collection system is provided. The system can include a vehicle, a conduit, a vacuum generator mounted to the vehicle to develop an airflow and to draw material into the conduit, and a moveable boom mounted to the vehicle to support the conduit. The system can include a control system to control a speed of the vacuum generator.

9 Claims, 15 Drawing Sheets

SYSTEM AND METHOD FOR EFFICIENT ENGINE OPERATION

CROSS-REFERENCE TO RELATED APPLICATIONS

This application is a divisional of U.S. application Ser. No. 18/048,708, filed Oct. 21, 2022, which is incorporated here by reference in the entirety.

FIELD

The present disclosure generally relates to systems and methods for efficient engine operation. In particular, aspects relate to efficient operation of material collection systems.

BACKGROUND

Material collection systems can be used to intake a variety of debris for removal and disposal. Some material collection systems can include additional functionality such as cleaning, sweeping, and excavation. Some material collection systems can be mounted onto a vehicle or a trailer pulled by a vehicle, others can be mounted onto other mobile equipment such as tracked or rail-bound vehicles. Material collection systems can utilize a number of mechanisms for intaking debris. For example, some material collection equipment can use a vacuum generator to intake debris. An operator can manually control the power of the vacuum generator (i.e., manually change the speed of the vacuum generator).

BRIEF SUMMARY

Some aspects of the invention provide a material collection system including a vehicle, a conduit having a material inlet, a vacuum generator mounted to the vehicle to develop an airflow and draw material into the material inlet, a boom mounted to the vehicle to support the conduit, a speed sensor, and a control system. The boom is movable from a stowed position to an operating position. The speed sensor can detect a travel speed of the vehicle and transmit a first output signal indicating the travel speed of the vehicle. The control system can control a speed of the vacuum generator to a first speed setting and a second speed setting based on the first output signal.

In some aspects, the first speed setting is an idle speed of the vacuum generator, and the second speed setting is a work speed of the vacuum generator that is greater than the idle speed.

In some aspects, the idle speed is in a range of approximately zero RPM to approximately 100 RPM.

In some aspects, the control system controls the speed of the vacuum generator by altering an energy input to the vacuum generator.

In some aspects, the control system controls alters the energy input to approximately zero based on the first output signal.

In some aspects, the control system controls the vacuum generator to the first speed setting when the first output signal indicates the travel speed is greater than a threshold.

In some aspects, the system further includes a timer to determine a time duration and transmit a second output signal indicating the time duration. The control system can activate the timer to begin determining the time duration based on the first output signal, and control the speed of the vacuum generator based on the second output signal.

In some aspects, the control system activates the timer when the first output signal indicates the travel speed is greater than a first threshold and less than a second threshold, and control system controls the vacuum generator to the first speed setting when the second output signal indicates the time duration is a first time.

In some aspects, the control system activates the timer when the first output signal indicates the travel speed is greater than the second threshold, and the control system controls the vacuum generator to the first speed setting when the second output signal indicates the time duration is a second time that is less than the first time.

In some aspects, the control system controls the vacuum generator to the second speed setting when the output signal indicates the travel speed is less than a threshold.

In some aspects, the system further includes a material sensor to detect a presence, absence, or amount of material and transmit a third output signal indicating the presence, absence, or amount of material. The control system can activate the material sensor to begin detecting the presence, absence, or amount of material based on the first output signal, and control the speed of the vacuum generator based on the third output signal.

In some aspects, the control system activates the material sensor when the first output signal indicates the travel speed is less than a threshold.

In some aspects, the control system controls the vacuum generator to the first speed setting when the third output signal indicates an absence of material.

In some aspects, the control system controls the vacuum generator to the second speed setting when the third output signal indicates the presence of material.

In some aspects, the material sensor detects material that is within approximately three feet from the material inlet of the conduit.

Some aspects of the invention provide a material collection system including a vehicle, a conduit mounted to the vehicle and having a material inlet, a vacuum generator mounted to the vehicle, a battery power, a GPS system, and a control system. The vacuum generator can develop an airflow and draw material into the material inlet. The battery can power the vehicle and the vacuum generator and include a percentage of battery power. The GPS system can store a first location and detect a second location of the vehicle, the vehicle being moved from the first location to the second location. The control system can control a speed of the vacuum generator to a first speed setting and a second speed setting based on the percentage of battery power, the first location, and second location.

In some aspects, the first speed setting is an idle speed of the vacuum generator, and the second speed setting is a work speed of the vacuum generator that is greater than the idle speed.

In some aspects, the control system determines a remaining distance the vehicle can travel based on the percentage of battery power.

In some aspects, the control system controls the vacuum generator to the first speed setting when a distance between the first location and the second location is less than the remaining distance.

In some aspects, the system further includes a first input to receive at least one of an operator ID or a route ID. The route ID indicates at least one of a terrain, a traffic pattern, or a weather condition. The control system further controls the speed of the vacuum generator based on the first input.

Some aspects of the invention provide a method for operating a material collection system including operating a vacuum generator at a first speed, receiving a first signal from a sensor indicating a travel speed of the material collection system, receiving a second signal from a timer indicating a time duration based on the first signal, and controlling the speed of the vacuum generator to a second speed based on the first signal and the second signal. The vacuum generator develops an airflow to draw material into a material inlet of a conduit;

In some aspects, the method further includes receiving a third signal indicating movement of a boom between a stowed position and an operating position, and controlling the speed of the vacuum generator to the second speed further based on the third signal. The boom supports the conduit.

BRIEF DESCRIPTION OF THE FIGURES

The accompanying drawings, which are incorporated herein and form part of the specification, illustrate aspects and, together with the description, further serve to explain the principles of the aspects and to enable a person skilled in the relevant art(s) to make and use the aspects.

Figure 1:
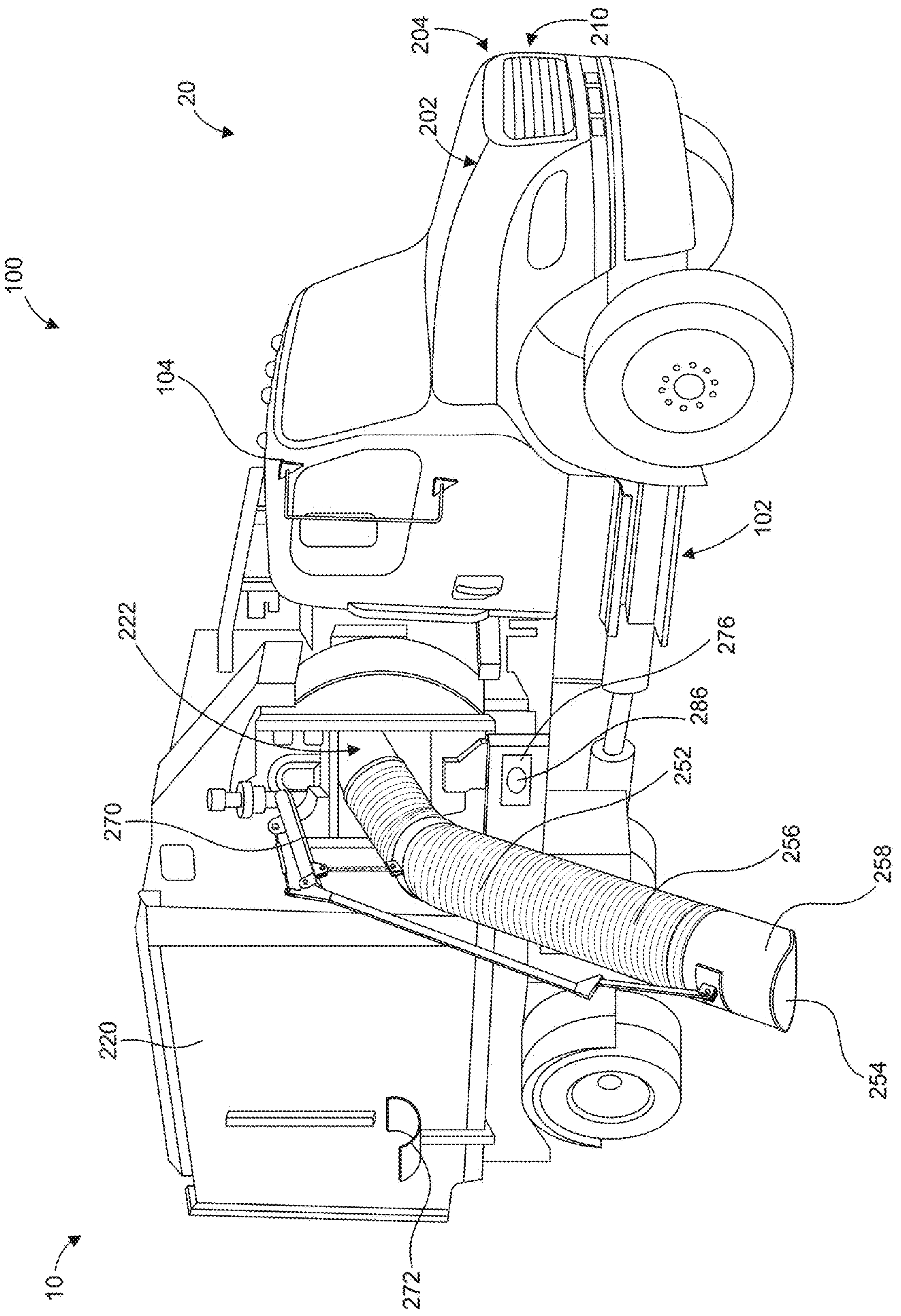
FIG. 1 is a perspective view of a material collection system according to various aspects.

The features and advantages of the aspects will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION

Aspects of the present disclosure are described in detail with reference to aspects thereof as illustrated in the accompanying drawings. References to "one aspect," "an aspect," "an exemplary aspect," etc., indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

Material collection systems can be used to intake a variety of materials, such as debris. Material collection systems can include components such as a conduit supported by a boom. The conduit can be used to direct airflow generated by a vacuum generator and have an intake end to engage with a pickup site for material collection, such as via a nozzle.

Material collection systems can be driven using a variety of power sources. For example, a material collection system can be mounted onto a vehicle having an engine, such as an internal combustion engine or an electric motor. The engine can propel the vehicle forward and drive the boom, vacuum generator, and/or other material collection equipment. The vacuum generator, powered by the engine, can run at various speeds and can be specified by an operator. Material collection systems can alternatively be mounted onto other mobile equipment such as tracked or rail-bound vehicles or a trailer pulled by a vehicle. The power source for the mounted material collection system can be an internal combustion engine or an electric motor.

The vacuum generator powered by the vehicle engine can operate at a work speed, e.g., a higher operating speed, for as long as the vehicle and the vehicle engine is running. The vehicle can run for several hours or entire days. During these run periods, the vehicle can run when not operating to collect material, such as while traveling to and from the pickup site. Accordingly, the vacuum generator can remain at the work speed for large amounts of time outside of material collection operation.

Keeping the vacuum generator speed at the work speed when not collecting material can be an inefficient use of power. Consumption of fuel/battery can lead to a need to refuel or charge and to service the engine, which can require expending additional time and monetary resources. In addition, excess consumption of fuel/battery can increase the environmental impact of material collection. Efficient vehicle power consumption can be beneficial, especially in trucks that consume a large amount of fuel/battery. Conserving fuel/battery can reduce the need to refuel or charge, or to service the engine. Associated costs and personnel time can be reduced as a result. In addition, emissions can be limited such that the environmental impact of material collection is reduced. As discussed herein, it can be beneficial to operate the vacuum generator at a higher speed, e.g., a work speed, when collecting material, and operate the vacuum generator at a lower speed, e.g., an idle speed, when not collecting material.

Aspects of the present disclosure provide a material collection system that can include control systems and methods for efficient operation. Instead of running the vacuum generator at the work speed constantly for as long as the vehicle engine is running, the material collection system described herein can be operated under an energy saving mode. In the energy saving mode, the vacuum generator can run at lower speeds during intervals outside of a material collection operation. In this way, energy can be efficiently managed. In some aspects, the control system can determine when a material collection operation does not need run. For example, the boom can be in a stowed position, e.g., in a rack on the vehicle. Accordingly, material collection is not needed as the conduit supported by the boom is not in a position to collect material. The vacuum generator can therefore be set to run at lower speeds. Additionally or alternatively, the control system can determine when a material operation is not needed by determining that material is not present around the vehicle for collection, when the vehicle is traveling at a high speed for a certain time duration, and/or when a remaining fuel/battery level of the vehicle is insufficient to drive the vehicle back to a base location for refilling/recharging. Based on one or more of these determinations, the vacuum generator can be set to run at lower speeds to conserve energy.

In some aspects, reducing the vacuum generator speed during intervals outside of material collection operation can reduce overall fuel/battery consumption by up to approximately three gallons per hour less or a comparable decrease in electrical power consumption. Additionally, in some aspects, reducing fuel/battery consumption can reduce operating costs. For example, reduced fuel consumption can save up to $5,000 cost per leaf season, and reduced battery consumption can size down the battery storage requirement, saving up to $13,5000 cost from a full battery system. In some aspects, reducing fuel/battery consumption can also reduce noise (i.e., up to 50%) and particulate matter collection (i.e., up to 50%). In some aspects, the energy saving mode can reduce particulate matter production as the airflow is periodically reduced by lowering the vacuum generator speed. In this way, the volume of air that enters a container and its exhaust is reduced. In addition, running a power source at a lower speed (including for prolonged periods) can reduce wear and tear on components. For example, running an engine at a lower speed can lower engine revolutions, reducing wear and tear on engine moving components. This can reduce the need for servicing and produce additional cost savings.

In some aspects, the material collection system can include one or more sensors that detect and transmit information to the control system to determine whether a material collection operation is needed. In some aspects, the information can be related to the boom position, the presence of material around the vehicle to be collected, the travel speed of the vehicle, the remaining fuel/battery level, and/or the current location of the vehicle relative to a base location. For example, a boom-in-rack sensor can indicate when the boom is in a stowed position, e.g., in a rack on the vehicle. A material sensor can indicate when and where material is detected around the vehicle. A speed sensor can indicate the travel speed of the vehicle. An energy sensor can indicate the remaining fuel/battery level of the vehicle. A GPS system can indicate the current location of the vehicle relative to a base location. This and other information can be used to determine whether a material collection operation can be run.

In some aspects, the material collection system can include a timer to indicate and transmit a time duration to the control system. The control system can combine the time duration with one or more conditions of the material collection system to determine when material collection operation does not need to be run. The timer can increase reliability and accuracy of the determination. Because conditions of the material collection system can fluctuate during an operation, an instantaneous change in a condition does not always indicate that material collection operation does not need to be run. For example, during material collection operation, the vehicle may briefly increase the travel speed to a high speed to avoid a traffic condition (i.e., travelling at a high speed for approximately two seconds). However, the material collection operation can continue rather than be suspended. In some aspects, the time delay to alternately trigger and suspend a material collection operation can advance efficient energy consumption because power utilization associated with startup can be significant. Accordingly, delaying suspension of a material collection operation until a work speed of the vacuum generator is not needed for a prolonged period can facilitate energy savings. A time duration associated with the material collection system travel speed can indicate when material collection operation, and thus a work speed of the vacuum generator, is not needed such that the material collection operation can be suspended. In this way, time delays can be used to trigger and suspend a material collection operation to advance efficient energy consumption.

Based on the information provided by sensors, the control system under the energy saving mode can determine whether the vacuum generator speed can be reduced. The control system can then provide control of the power source and/or the material collection system components accordingly. Appropriate control of the power source and/or the material collection system components, such as the boom and vacuum generator, can provide greater operating efficiency. The control system can include stored programs (i.e., control logic) to instruct the processor on controlling the power source and/or material collection components. For example, the control system can adjust the engine speed or the vacuum generator speed based on programmed instructions and/or user input. The control system can further include a control device to operate the control system.

The control system can also store a predetermined routine of material collection operation including operator specific parameters, such as a work time or a work route, and/or route specific parameters, such as a terrain, a traffic pattern, or a weather condition. The stored routine can be activated by an operator ID and/or a route ID, which can be input by an operator. The control system under the energy saving mode can determine when a material collection operation does not need to run and adjust the engine speed or the vacuum generator speed based on the selected routine.

In some aspects, in additional to the control system, the material collection system can also provide various ways to receive an operator's command to reduce the vacuum generator speed. An operator's determination to reduce the vacuum generator can supplement the control system, thereby further conserving energy.

Aspects will now be described with reference to the figures. With reference to FIG. 1, in some aspects, a material collection system 100 can include material collection components 10 and vehicle 20, which can be, for example, a truck. Vehicle 20 can include a chassis 102 and a cab 104 mounted on chassis 102. Material collection components 10 can be mounted on vehicle 20. Material collection system 100 can facilitate efficient engine operation.

In some aspects, material collection components 10 and cab 104 can be mounted on chassis 102. An operator can reside in cab 104 and drive vehicle 20 to a material pickup site. In some aspects, the operator can reside in cab 104 during a material collection operation and can control material collection components 10 from inside cab 104. In another aspect, the operator and/or a second operator can manually control material collection components 10. For example, the operator can reside in cab 104 and a second operator can be external to cab 104. In some aspects, material collection components 10 can include a power source 202, a vacuum generator 232 (FIG. 5), a conduit 252, and/or a boom 270.

Figure 2:
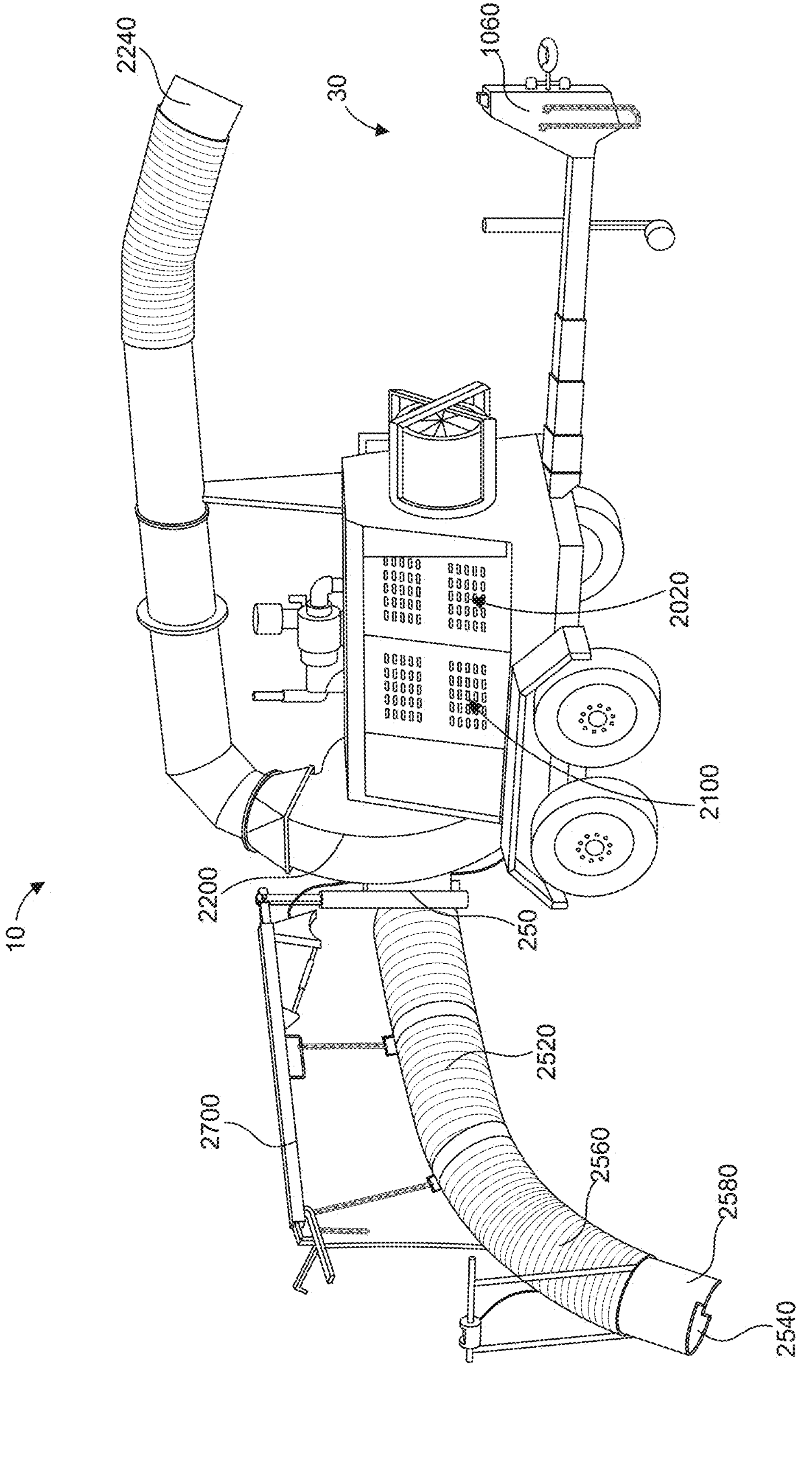
FIG. 2 is a perspective view of a material collection system according to various aspects.

With reference to FIG. 2, in some aspects, material collection components 10 can be mounted onto a trailer 30 (i.e., a dual-axle trailer), and can include chassis 1020 and/or a towbar 1060. Material collection components 10 can include a power source 2020, a vacuum generator 2320, a conduit 2520, and/or a boom 2700. In some aspects, material collection components 10 can be mounted on chassis 1020. In some aspects, towbar 1060 can connect chassis 1020 to a towing vehicle (not shown). The towing vehicle can provide motive power to move material collection system 100. In some aspects, power source 202 can include an auxiliary engine 2100 that can power vacuum generator 2320 or other material collection components 10. In some aspects, auxiliary engine 2100 to power material collection components 10 can be an electrical motor powered by a battery hybrid or battery system.

Throughout the disclosure, components can be referred to with reference to material collection components 10 that can be mounted on a vehicle 20, but it will be appreciated that the disclosed systems and methods can be applicable to other aspects as well (i.e., mounted to a trailer, or tracked or rail-bound vehicles), and can include additional functionalities (i.e., sweeping, sewer cleaning, contamination removal, excavation, and/or landscaping, stump and mulch removal, litter collection, rail ballast collection, residential and industrial “shop vac”).

Figure 3:
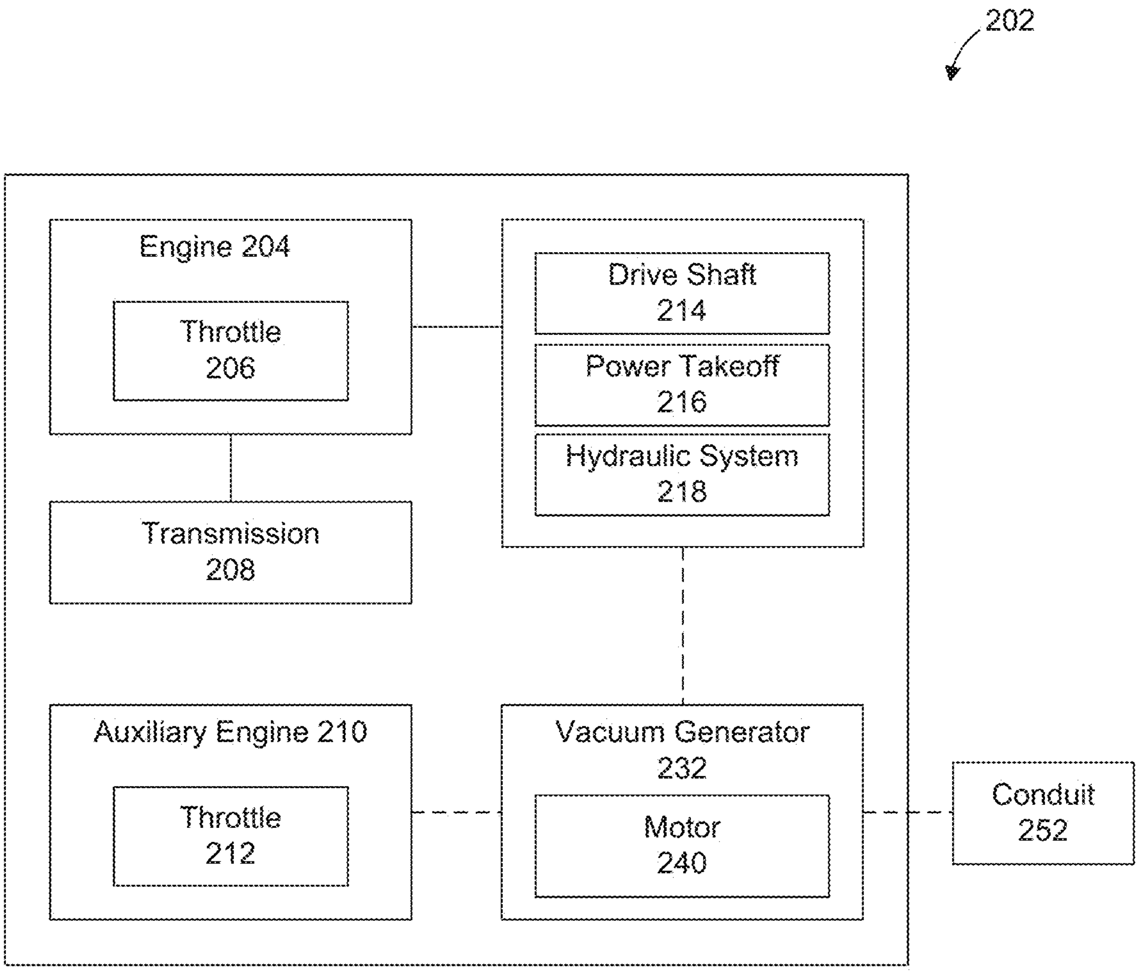
FIG. 3 is a vehicle component schematic according to various aspects.
Figure 4:
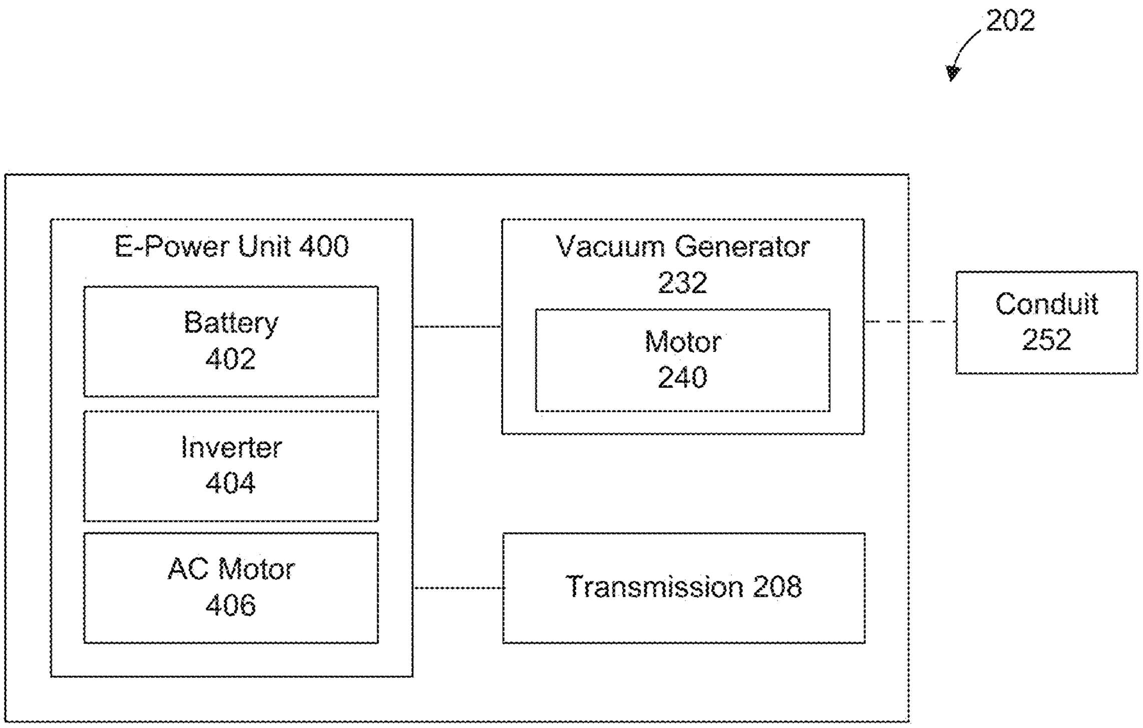
FIG. 4 is a vehicle component schematic according to various aspects.

Material collection system 100 can include one or more power sources efficiently operated to conserve energy. With reference to FIGS. 3-4, in some aspects, a power source 202 can provide motive power to vehicle 20. For example, power source 202 can include an engine 204 (i.e., a primary engine powering vehicle 20) to move vehicle 20. In some aspects, engine 204 can be an internal combustion engine. In other aspects, power source 202 can include an electric power unit 400 having an electric motor 406. Engine 204 and electric motor 406 can provide the motive power to propel vehicle 20 forward or backward. In an aspect, engine 204 and electric motor 406 can also power material collection components 10 mounted onto vehicle 20.

With reference to FIG. 3, in some aspects, power source 202 can include engine 204 (i.e., an internal combustion engine), a throttle 206, a transmission 208, an auxiliary engine 210, a throttle 212, a drive shaft 214, power takeoff(s) 216, and/or a hydraulic system 218. In some aspects, power source 202 can power material collection components 10 (FIG. 1), such as a vacuum generator 232. In some aspects, while at a high speed (i.e., above approximately 1,200 revolutions per minute (RPM)), vacuum generator 232 can have sustained kinetic energy. Accordingly, power source 202 can disengage from vacuum generator 232 at high speeds. In this way, energy can be conserved to facilitate efficient engine operation.

In some aspects, throttle 206 can control the power output of engine 204. In an aspect, engine can provide power to transmission 208 to propel the movement of vehicle 20. In an aspect, engine 204 can provide power to drive vacuum generator 232 and/or other material collection components 10. Engine 204 can, for example, power vacuum generator 232 using drive shaft 214, power takeoff(s) 216, hydraulic system 218, or indirectly via a drive belt system. In some aspects, vehicle 20 can also include auxiliary engine 210 to provide power to drive vacuum generator 232. In some aspects, auxiliary engine 210 can be an internal combustion engine or an electric motor.

In some aspects, vacuum generator 232 can include a motor 240. In an aspect, motor 240 can drive vacuum generator 232 to create an airflow through conduit 252. Motor 240 can be an electrical motor powered by a battery hybrid or battery system.

With reference to FIG. 4, in some aspects, power source 202 can include an electric power unit 400. Electric power unit 400 can include a battery 402 (i.e., a DC battery), an electric motor 406 (i.e., an AC motor), and an inverter 404 to convert the DC output of battery 402 into AC input to motor 406. In some aspects, inverter 404 can also control the input to motor 406 and thus the speed of motor 406. In an aspect, battery 402 can be a battery hybrid and can be recharged by a generator onboard material collection system 100. Electric power unit 400 can power vacuum generator 232 and transmission 208 to propel the movement of vehicle 20. In an aspect, electric power unit 400 can be the source of power in power source 202, such that its power output is divided by transmission 208 and vacuum generator 232.

One or more material collection components 10 can be controlled to facilitate efficient engine operation. With reference to FIGS. 1 and 3-4, material collection system 100 can include one or more material collection components 10 for material collection. In some aspects, as shown in FIG. 1, for example, material collection components 10 can include vacuum generator 232, conduit 252, and/or boom 270. These and/or other components can be powered by power source 202. In some aspects, conduit 252 can be manually moved and positioned for material collection. In some aspects, vacuum generator 232 can be in fluid communication with conduit 252 supported by a boom 270. For example, conduit 252 can be removably coupled to an inlet port 236 of vacuum generator 232. In some aspects, vacuum generator 232 can generate an airflow for drawing material through an intake end 258 of conduit 252.

In some aspects, vacuum generator 232 and conduit 252 can be in fluid communication with a container 220 such that container 220 receives material collected through conduit 252. In some aspects, material can be moved through inlet 222 of container 220. In some aspects, container can have an inlet 222 to facilitate intake of material. Material can be moved through conduit 252 to an inlet 222 of container 220. In some aspects, vacuum generator 232 and conduit 252 can be in fluid communication with a container 220 such that container 220 receives material collected through conduit 252. In some aspects, material can be moved through conduit 252 to an inlet 222 of container 220.

Figure 5:
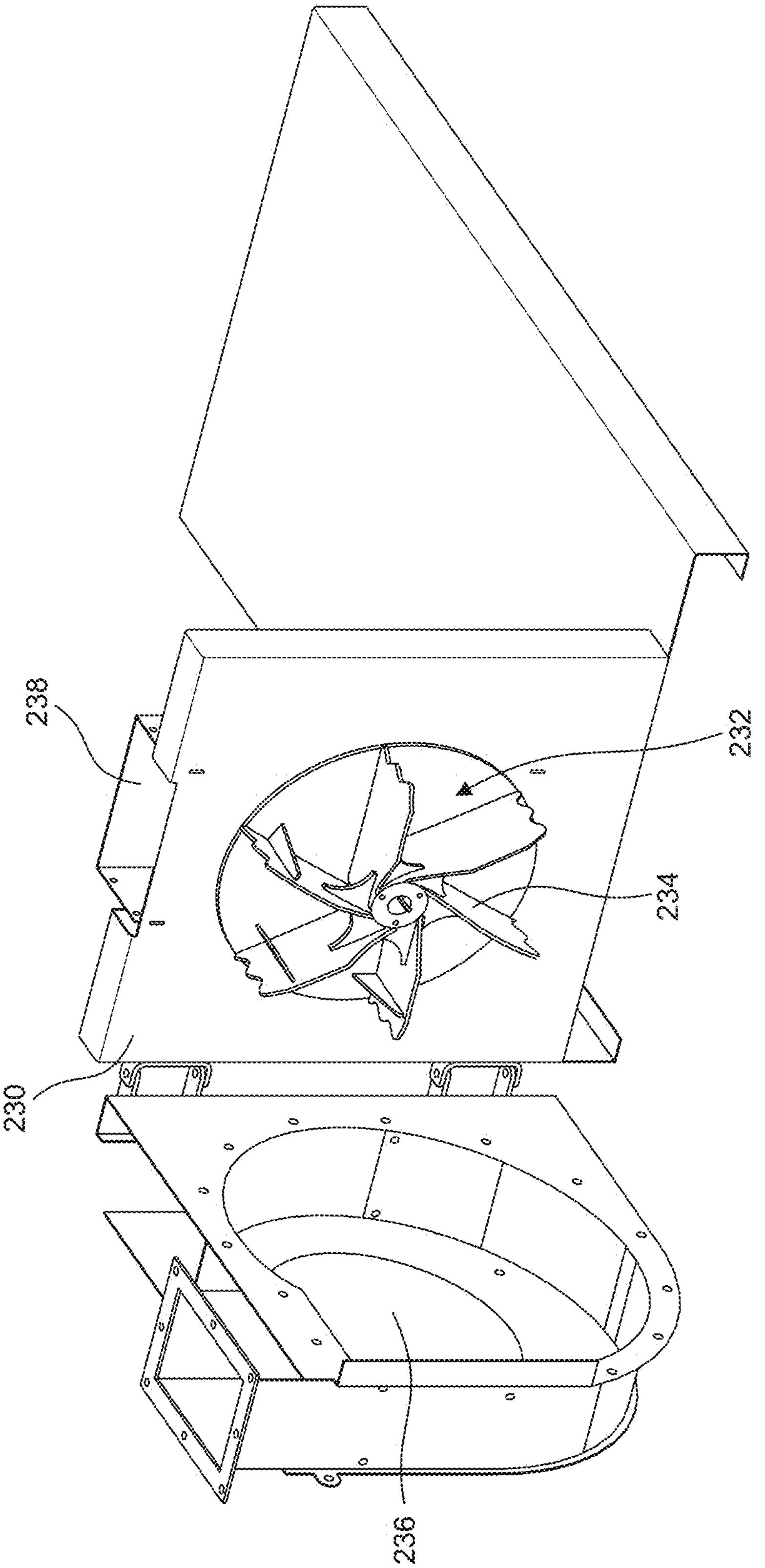
FIG. 5 is a perspective view of a vacuum generator according to various aspects.

Vacuum generator 232 is shown, for example, in FIG. 5. In some aspects, the airflow developed by vacuum generator 232 can retrieve material from the pickup site. For example, the airflow generated by vacuum generator 232 can create a substantial air pressure differential between conduit 252 and the ambient air of the area surrounding intake end 258 of conduit 252 to draw material into conduit 252. In some aspects, material disposed in the pickup site can be drawn by the airflow through intake end 258 and travel through conduit 252 and vacuum generator 232. In some aspects, container 220 (FIG. 1) can further include an outlet for exhausting the airflow into the ambient environment. In other aspects, airflow can be recirculated to develop a regenerative vacuum in vacuum generator 232. In some aspects, material can be collected in container 220.

In some aspects, vacuum generator 232 can include a fan 233, such as centrifugal fan or an axial fan. In some aspects, fan 233 can develop an airflow and draw material into intake end 258 of conduit 252. In some aspects, fan 233 can have a plurality of blades 234 that can rotate when powered to develop a sub-atmospheric pressure airflow. Blades 234 can also break incoming material into smaller pieces as the material passes through blades 234. In some aspects, fan 233 can include a diameter in a range of approximately 18 inches to approximately 22 inches, such as approximately 20 inches. In some aspects, fan 233 of vacuum generator 232 can generate a volumetric flow rate in a range of approximately 4,000 cubic feet per minute (CFM) to approximately 10,000 CFM, such as approximately 6,000 CFM to approximately 8,000 CFM.

In some aspects, vacuum generator 232 can include a housing 230 partially enclosing fan 233. In some aspects, housing 230 can include the outlet port 238 connected to container 220 via duct 224. In some aspects, housing 230 can include a frame 237 to accommodate inlet port 236 for receiving an outlet end 264 of conduit 252. In some aspects, housing 230 can be pivotably coupled to frame 237 by a hinge 231 such that housing 230 can be pivoted away from inlet port 236 to provide access to fan 233 for servicing. In some aspects, vacuum generator 232 does not directly convey material through a fan, but can generate a negative pressure to draw in material for discharge into container 220. In some aspects, vacuum generator 232 can be a Venturi vacuum generator that can produce a stream of compressed air to create a vacuum and intake material.

Figure 6:
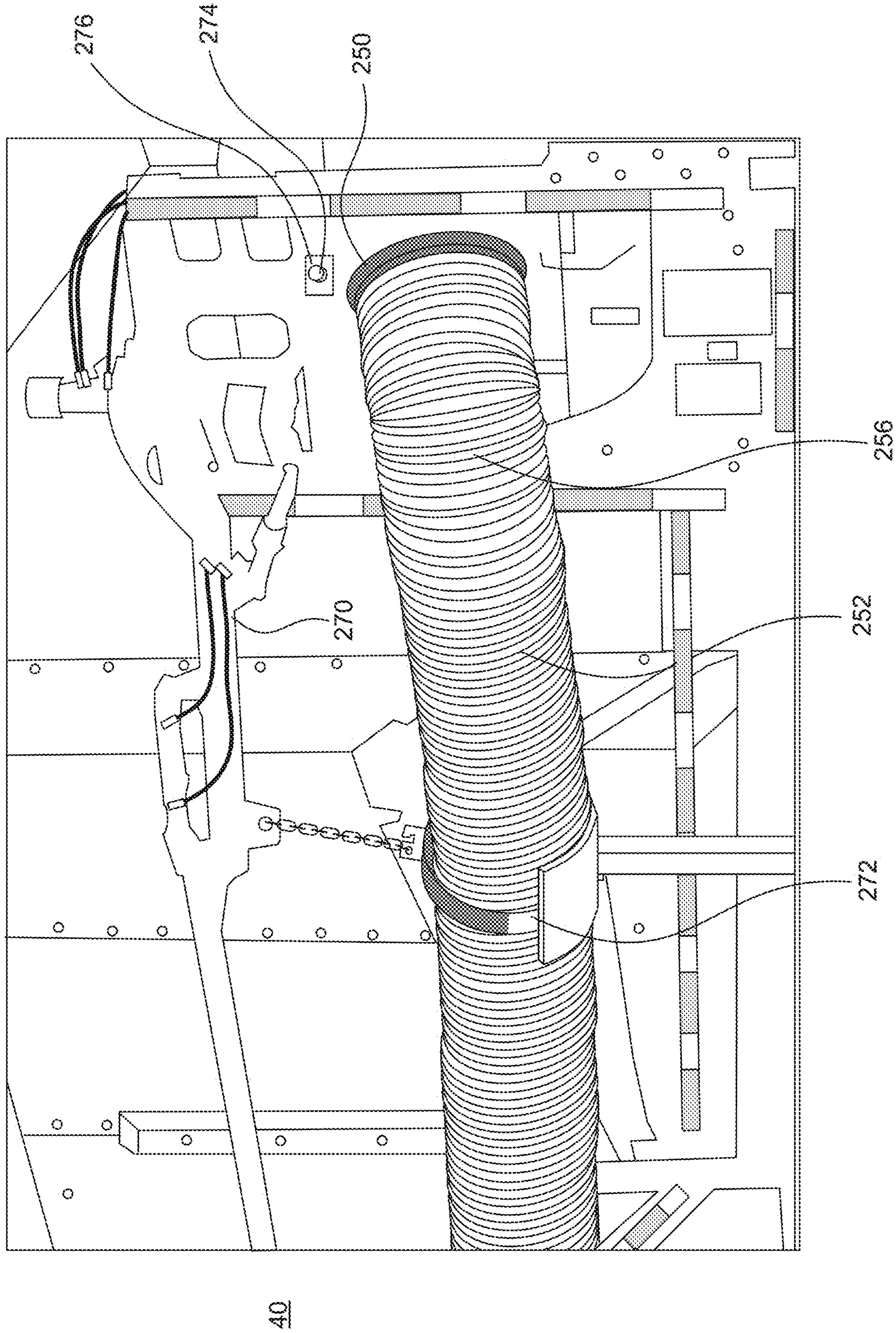
FIG. 6 is a perspective view of material collection system components according to various aspects.
Figure 7:
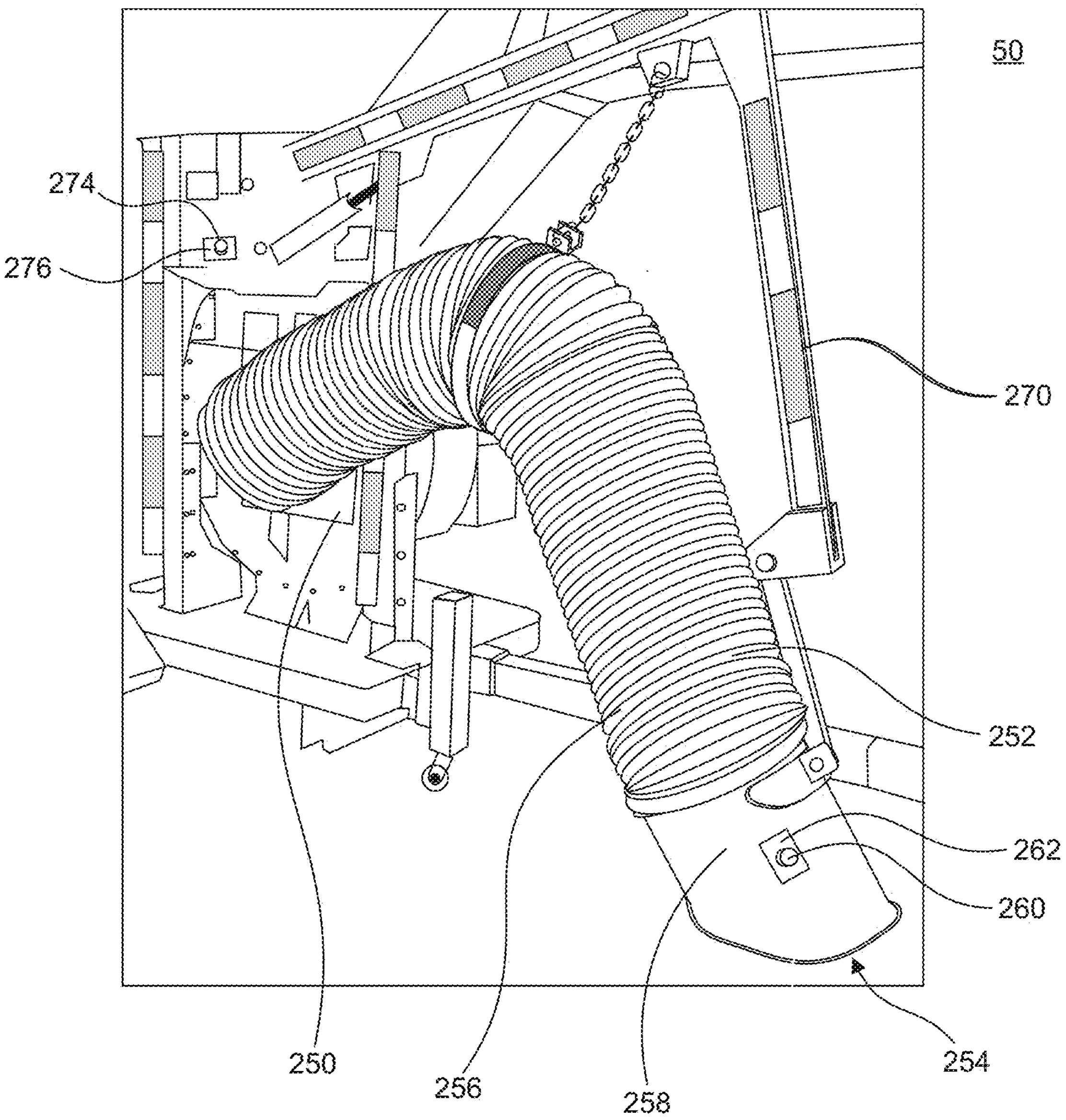
FIG. 7 is a perspective view of material collection system components according to various aspects.

With reference to FIGS. 6-7, in some aspects, conduit 252 can include an interior wall 254 and an exterior wall 256, and can extend away from vacuum generator 232 and terminate at intake end 258. In some aspects, interior wall 254 can be configured to support the airflow through conduit 252. For example, interior wall 254 can be smooth and free of obstructions. In some aspects, conduit 252 can comprise a flexible material (i.e., elastic material) so that the conduit 252 can be bent or flexed to adjust the position of intake end 258 to a variety of positions around the pickup site surrounding vehicle 20. In some aspects, one or more sections of interior wall 254 and/or exterior wall 256 can include corrugated plastic. In some aspects, interior wall 254 and/or exterior wall 256 can include plastics, metals, composites, or a combination thereof.

In some aspects, boom 270 can lift and support conduit 252. In some aspects, boom 270 can be in a rack 272 such that boom 270 can be in a stowed position 40. In the stowed position 40, boom 270 can be substantially parallel to chassis 102. In some aspects, conduit 252 can extend outward from vehicle 20 such that boom 270 can be in an operational position 50 to position conduit 252 to intake material.

In some aspects, the amount of conduit 252 that extends from vehicle 20 can be adjustable such that conduit 252 can extend from vehicle 20 more or less, depending on the position of vehicle 20 and/or the pickup site. In some aspects, the extension of conduit 252 can be adjusted before or during a material collection operation. In some aspects, conduit 252 can include a length in a range of approximately 6 feet to approximately 12 feet, such that the length of conduit 252 provides a sufficient range of reach to collect material around vehicle 20, while minimizing weight. In some aspects, conduit 252 can include a diameter in a range of approximately 10 inches to approximately 16 inches, such that the power source 202 can operate effectively with less power capacity to generate sufficient suction force within conduit 252 to collect material.

In some aspects, boom 270 can be moved from a lower position (i.e., a position substantially parallel to chassis 102), as shown in FIG. 6, to a higher position (i.e., a position at an angle relative to chassis 102), as shown in FIG. 7. In an aspect, the lower position can be stowed position 40 and the higher position can be operational position 50. In other aspects, boom 270 can control movement of conduit 252 such that the position of intake end 248 can be adjusted in longitudinal direction, a lateral direction, and/or a vertical direction. In some aspects, the combination of moveable boom 270 and elastic conduit 252 can provide flexible positioning of intake end 248 at pickup sites.

In some aspects, material collection system 100 can include a hydraulic system 218 (FIG. 3). In some aspects, hydraulic system 218 can be operatively connected to boom 270 to adjust the position of conduit 252. In some aspects, hydraulic system 218 can include one or more boom actuators, such as for example, a hydraulic cylinder with a reciprocating piston rod, to move boom 270 such that the position of conduit 252 can be adjusted in a lateral direction, a longitudinal direction, and/or a vertical direction.

In some aspects, a control system 300 can determine whether material collection operation needs to run and can control material collection components 10 (FIG. 1) accordingly. In this way, material collection system 100 (FIG. 1) can realize efficient engine operation and energy savings. In some aspects, material collection system 100 can have a control system 300, shown in FIG. 8, to provide a fuel/battery saving method of operation under an energy saving mode 326. In some aspects, control system 300 can run one or more modes including energy saving mode 326.

In an aspect, energy saving mode 326 can automatically reduce the engine speed or electric motor speed when high power is not needed. The speed of vacuum generator 232 can be similarly reduced as it can operate at approximately the same speed as the engine. In this disclosure, "approximately" can mean a range of 100 RPM (revolutions per minute) above or below the stated speed. In some aspects, the engine speed can range from approximately 600 RPM to approximately 6,000 RPM. In some aspects, the electric motor speed can range from approximately zero RPM to approximately 6,000 RPM. In some aspects, material collection system 100 and/or vehicle 20 can use renewable energy sources, such as solar energy, which can also be monitored and/or controlled in energy saving mode.

In some aspects, during intervals when high power is not needed, control system 300 under energy saving mode 326 can reduce the engine speed or electric motor speed to a first speed. The speed of vacuum generator 232 can accordingly be reduced to the first speed. The first speed, in some aspects, can be an idle speed. In some aspects, where the power source is engine 204, the first speed and be an idle speed that is approximately 1200 RPM. In some aspects, where the power source is electric power unit 400 with electric motor 406, the first speed can be an idle speed that is in a range of approximately zero RPM to approximately 100 RPM. In some aspects, control system 300 can alter an energy input to vacuum generator 232 and reduce the speed of vacuum generator 232 by altering the energy input to approximately zero. For example, control system 300 can allow vacuum generator 232 to spin without energy input. In another aspect, control system 300 can mechanically decouple vacuum generator 232 to allow vacuum generator 232 to spin without energy input.

In some aspects, during intervals when high power is needed, control system 300 under energy saving mode 326 can allow the engine speed or electric motor speed to run at a second speed that is higher than the first speed. The speed of vacuum generator can accordingly be controlled at the second speed. The second speed, in some aspects, can be a work speed that is higher than approximately 1200 RPM, for example, approximately 2500 RPM, such as approximately 3200 RPM, such as approximately 4000 RPM.

In some aspects, control system 300 under energy saving mode 326 can determine high power is not needed in material collection system 100 and thus reduce engine speed or electric motor speed to the first speed based on different conditions of material collection system 100. These conditions can be indicative of when material collection operation is not needed. While aspects of the invention(s) will refer to certain conditions, it will be appreciated that energy saving mode 326 can run in additional or alternative conditions.

In an aspect, control system 300 can determine when material collection operation is not needed based on one or more sensors that detect and transmit information to a control system to determine. In some aspects, the information can be related to material collection components 10 (FIG. 1). In some aspects, control system 300 can determine that material collection operation is not needed when boom 270 is in a stowed position (i.e., in a rack on the vehicle). In an aspect, control system 300 can determine that material collection operation is not needed when material is not present around material collection system 100 for collection. In an aspect, control system 300 can determine that material collection operation is not needed when a travel speed of vehicle 20 is a high speed (i.e., greater than approximately 20 miles per hour (mph)). In an aspect, control system 300 can determine that material collection operation is not needed when a travel speed of vehicle 20 is an intermediate speed (i.e., greater than approximately five mph but lower than approximately 20 mph) for a long time duration (i.e., approximately 120 seconds). In an aspect, control system 300 can determine that material collection operation is not needed when a remaining fuel/battery level of vehicle 20 is insufficient to drive vehicle 20 back to a base location for refueling/recharging. Additional or alternative information can indicate that a material collection operation can be run or not needed. Accordingly, material collection system 100 (FIG. 1) can realize efficient engine operation and energy savings.

In some other aspects, control system 300 under energy saving mode 326 can determine high power is not needed and thus reduce the engine speed or electric motor speed to the first speed based on a combination of two or more conditions of material collection system 100. The speed of vacuum generator 232 can accordingly be reduced.

In some aspects, material collection system 100 can include one or more sensors to detect and transmit to control system 300 output signals indicating one or more conditions of material collection system 100. In some aspects, the sensors can include digital and/or analog sensors. In some aspects, the sensors can output amplified and/or unamplified signals. In some aspects, the sensors can be self-contained in its own housing (i.e., they include the sensor and a power source in a housing). In some aspects, the sensors can be modular such that a sensor can be removably attached to material collection components 10, or integrated into material collection components 10. In other aspects, the sensors can be a remote sensor powered by a remote power source. In some aspects, the sensors can also use a variety of renewable power sources (i.e., solar power, ambient RF, thermoelectric, etc.).

In some aspects, the sensors can be photoelectric sensors. Photoelectric sensors can include a receiver and an emitter (i.e., an LED). The receiver can detect the absence or presence of an object by receiving and processing light (i.e., any light that exists on the electromagnetic spectrum). The receiver can include an optical diode to receive light and configure an output. In some aspects, the photoelectric sensor is a reflective sensor that can be limited to a light spectrum (i.e., visible or infrared). For example, an infrared reflective sensor can detect objects that reflect light within the infrared spectrum. In this embodiment, photoelectric sensors can be located within a body to avoid interference from the sun. In some aspects, the photoelectric sensor can be a light beam sensor that can emit light (i.e., any light that exists on the electromagnetic spectrum) and detect interference in the light reaching the receiver.

Figure 8:
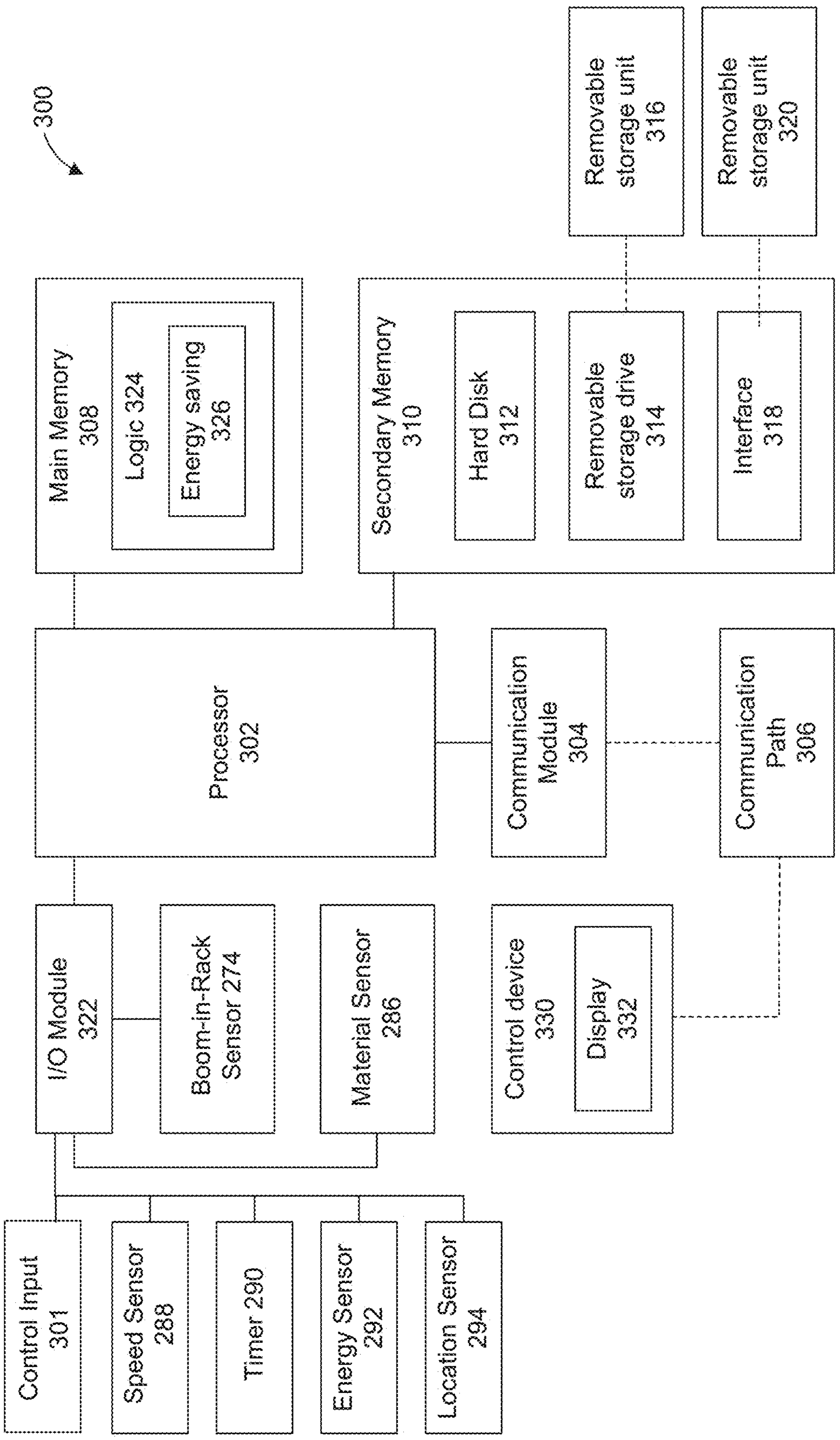
FIG. 8 a block diagram of an example control system according to various aspects.

In some aspects, with reference to FIGS. 1 and 8, the sensors can include a material sensor 286. Material sensor 286 can detect a presence, absence, amount, and/or location of material around vehicle 20 and transmit an output signal to control system 300. In some aspects, material sensor 286 can be mounted on a curb side of vehicle 20 to allow a vision of the material pickup site. In some aspects, material sensor 286 can be mounted on intake end 248 of conduit 252. In an aspect, material sensor 286 can be a photoelectric sensor. In an aspect, material sensor 286 can be an ultrasonic sensor. In an aspect, material sensor 286 can be a camera, for example, time-of-flight camera, RGB-D camera, stereo camera, and/or color camera. Sensor output signal can include, for example, image, depth, and/or color data, or a combination thereof. For example, a material source (i.e., a leaf pile), can be detected using the depth data (i.e., one-dimensional, two-dimensional, or three-dimensional depth data). In some aspects, material sensor 286 can detect material that is within approximately three feet from intake end 248 of conduit 252. In some aspects, material sensor 286 can detect material that is approximately 10 feet to approximately 15 from the curb side of vehicle 20.

In some aspects, material sensor 286 can be mounted to material collection components 10 via sensor mount 276. Sensor mount 276 can provide additional adjustability of the position of boom-in-rack sensor 274, for example, vertical and/or horizontal adjustment. Additionally, in some aspects, sensor mount 276 can include a flexible arm that can support boom-in-rack sensor 274 and be shaped into a support position. Sensor mount 276 can further include an enclosure to protect boom-in-rack sensor 274. Positioning flexibility can increase the installation range and therefore sensing zone of boom-in-rack sensor 274. Sensor mount 276 can further include an enclosure for protection.

In some aspects, determining the absence of material can indicate that a material collection operation does not need to run. Accordingly, the speed of vacuum generator 232 (FIG. 5) can be reduced to an idle speed. In some aspects, determining the presence of material can indicate that a material collection operation can be run. Accordingly, the speed of vacuum generator 232 can be increased to a work speed.

In some aspects, with reference to FIGS. 6-8, the sensors can include a boom-in-rack sensor 274. In some aspects, boom-in-rack sensor 274 can be mounted onto hose eye 250 similarly via sensor mount 276. Boom-in-rack sensor 274 can detect whether boom 270 (FIG. 6) is positioned in rack 272 (FIG. 6) and transmit an output signal to control system 300. Rack 272 can support boom 270 in a stowed position. In some aspects, rack 272 can support boom-in-rack sensor 274. In some aspects, determining that boom 270 is positioned in rack 272 such that it is in a stowed position can indicate that a material collection operation does not need to run. Accordingly, the speed of vacuum generator 232 (FIG. 5) can be reduced to an idle speed. In some aspects, determining that boom 270 is not positioned in rack 272 such that it is in an operating position can indicate that a material collection operation can be run. Accordingly, the speed of vacuum generator 232 can be increased to a work speed.

In some aspects, with reference to FIGS. 1 and 8, the sensors can include a speed sensor 288. Speed sensor 288 can detect the travel speed of vehicle 20 and transmit the output to control system 300. In some aspects, speed sensor 288 can be mounted on an input or output shaft of transmission 208 (FIG. 3) and measure a rotational speed of the shafts. In some aspects, speed sensor 288 can be a wheel speed sensor mounted to an axle, which can measure a rotational speed of a road-wheel of vehicle 20. In some aspects, determining vehicle 20 is moving at a travel speed of greater than approximately five mph can indicate that a material collection operation does not need to run. Accordingly, the speed of vacuum generator 232 (FIG. 5) can be reduced to an idle speed. In some aspects, determining the vehicle 20 is moving at a travel speed of approximately five mph or less can indicate that a material collection operation can be run. Accordingly, the speed of vacuum generator 232 can be increased to a work speed.

In some aspects, with reference to FIG. 8, the sensors can include a location sensor 294. Location sensor 294 can determine a location of vehicle 20 and transmit the output to control system 300. In some aspects, location sensor 294 can be a Global Positioning System (GPS) 804 (FIG. 12) that communicates with a satellite to determine a location of vehicle 20. In some aspects, location sensor 294 can be an odometer that detects a distance that vehicle 20 has traveled from a base location, such that the location of vehicle 20 is indicated relative to the base location. In some aspects, one the location of vehicle 20 is sensed, determining vehicle 20 is far from a pickup site can indicate that a material collection operation does not need to run or cannot run. For example, a material collection operation does not need to run is approximately 15 feet away from the pickup site or approximately 25 feet away from the pickup site. Accordingly, the speed of vacuum generator 232 (FIG. 5) can be reduced to an idle speed. In some aspects, determining the vehicle 20 is close to a base station can indicate that a material collection operation can run, for example within approximately 15 feet to approximately 25 feet away from the pickup site Accordingly, the speed of vacuum generator 232 can be increased to a work speed.

In some aspects, the sensors can include an energy sensor 292. Energy sensor 292 can determine a remaining level of fuel or battery power in vehicle 20. In some aspects, where the power source is engine 204, energy sensor 292 can be a fuel level sensor to detect remaining level of fuel in a fuel tank of vehicle 20. In some aspects, where the power source is electric power unit 400, energy sensor 292 can be an integral to battery 402 to indicate a percentage of battery power. In some aspects, a remaining level of fuel or battery power can be compared with a location of vehicle 20 to determine whether the remaining level is low or sufficient. For example, a remaining level of fuel or battery power is low, if it cannot power vehicle 20 back to a base location for refueling or recharging. In some aspects, determining a remaining level of fuel or battery power is low can indicate that a material collection operation does not need to run or cannot run. Accordingly, the speed of vacuum generator 232 (FIG. 5) can be reduced to an idle speed. In some aspects, determining a remaining level of fuel or battery power is sufficient can indicate that a material collection operation can run. Accordingly, the speed of vacuum generator 232 can be increased to a work speed.

In some aspects, one or more sensors can constantly transmit a signal to control system 300. In some aspects, one or more sensors can periodically transmit a signal to control system 300. In some aspects, one or more sensors can transmit a signal to control system 300 after a time delay. In some aspect, the sensors can include a timer 290. Timer 290 can include a time duration and transmit a signal from one or more sensors to control system 300 after the expiration of the time duration. In this way, signals can be sent to control system 300 periodically based on a time delay. In some aspects, timer 290 can be set by the operator when control system 300 is offline or online. In some aspects, timer 290 can be activated and deactivated by control system 300. In some aspects, timer 290 can run based on one or more conditions of material collection system 100. In some aspects, timer 290 can run as long as the one or more conditions of material collection system 100 exists (i.e., the condition is true). In some aspects, timer 290 can reset if the one or more conditions of material collection system 100 is interrupted (i.e., the condition is not true). A time duration in combination with one or more conditions of material collection system 100 can more accurately indicate whether material collection operation is needed.

While aspects of the invention(s) refer to certain sensors, it will be appreciated that material collection system 100 can include additional sensors. For example, in additional aspects, the sensors can be pressure, oxygen, temperature, kinetic, location, non-photoelectric proximity, capacitive, conductive, vibration, acceleration sensors, or a combination thereof, and/or can process light, radio waves, sound waves, or a combination thereof.

With reference to FIG. 8, in some aspects, control system 300 can be implemented as computer-readable code. For example, processing of operator inputs and field inputs, or control of material collection system 10 components can be implemented in control system 300 using hardware, software, firmware, tangible non-transitory computer readable media having instructions, data structures, program modules, or other data stored thereon, or a combination thereof, and can be implemented in one or more computer systems or other processing systems. Material collection system 100 can include all or some of the components of control system 300 for implementing processes discussed herein.

In some aspects, computer programs (also called computer control logic) such as logic 324 are stored in main memory 308 and/or secondary memory 310. Computer programs can also be received via communication module 304. Such computer programs, when executed, can enable control system 300 to implement the aspects as discussed herein. In particular, the computer programs, when executed, can enable processor 302 to implement the processes of the aspects discussed here. Processor 302 can be in communication of I/O module 322 that receives output from various sensors discussed herein (i.e., boom-in-rack sensor 274, material sensor 286, speed sensor 288, timer 290, energy sensor 292, and/or location sensor 294). Accordingly, such computer programs represent controllers of the control system 300. Where the aspects are implemented using software, the software can be stored in a computer program product and loaded into control system 300 using removable storage drive 314, interface 318, and hard disk drive 312, communication module 304, and/or a cloud-based system via radio wireless systems.

In some aspects, control system 300 can include one or more control devices 330. In some aspects, control device can include an interface 332. Interface 332 can include input and output devices, such as touchscreen, keyboards, mice, etc., that forwards graphics, text, and other data to and from communication module 304 via communication path 306. In some aspects, an operator can trigger control device 300 to actuate a control input 301. Control input 301 can activate one or more modes of material collection system 100 (FIG. 1). In this way, energy saving mode 326 can be operator-activated.

Figure 9:
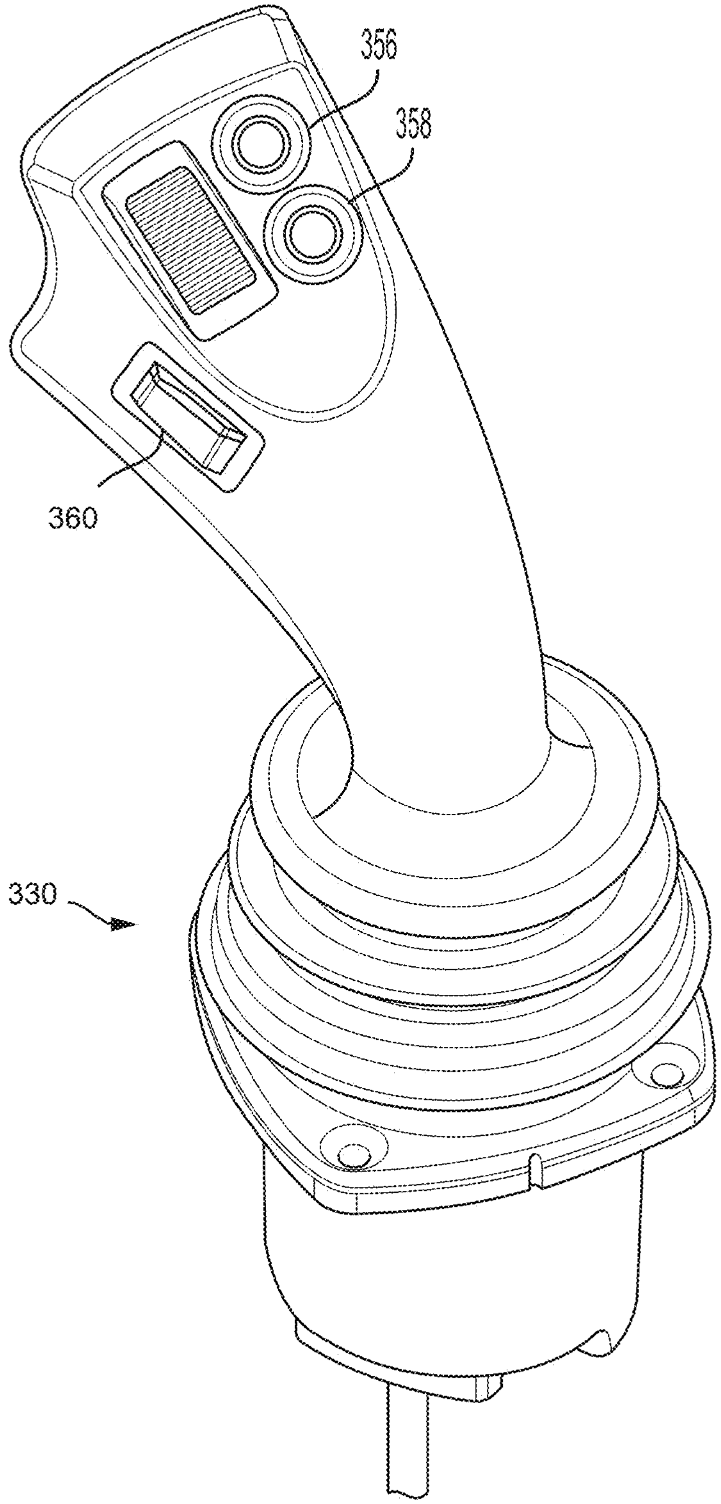
FIG. 9 is a perspective view of a joystick for controlling a material collection system according to various aspects.

With reference to FIG. 9, in some aspects, control device 330 can be a joystick 330. Joystick 330 can have control inputs 356, 358, and 360 for an operator to input a control input 301 (FIG. 8) to control system 300 (FIG. 8). For example, the operator can switch on and off energy saving mode 326 via control button 356, and when energy saving mode 326 is not switched on, the operator can use control button 358 to switch between the highway mode and the work mode. Alternative, rocker switch 360 can achieve the same function as control buttons 356 and 358.

FIGS. 10-14 show example methods executed by control system 300 (FIG. 8) for operating material collection system 100 (FIG. 1) under energy saving mode 326 (FIG. 8). As discussed herein, energy saving mode 326 can facilitate efficient power consumption. While example methods are described with reference to vacuum generator 232, it is to be appreciated that other components of power source 202 (FIG. 3) can be used to execute any of the following steps.

Figure 10:
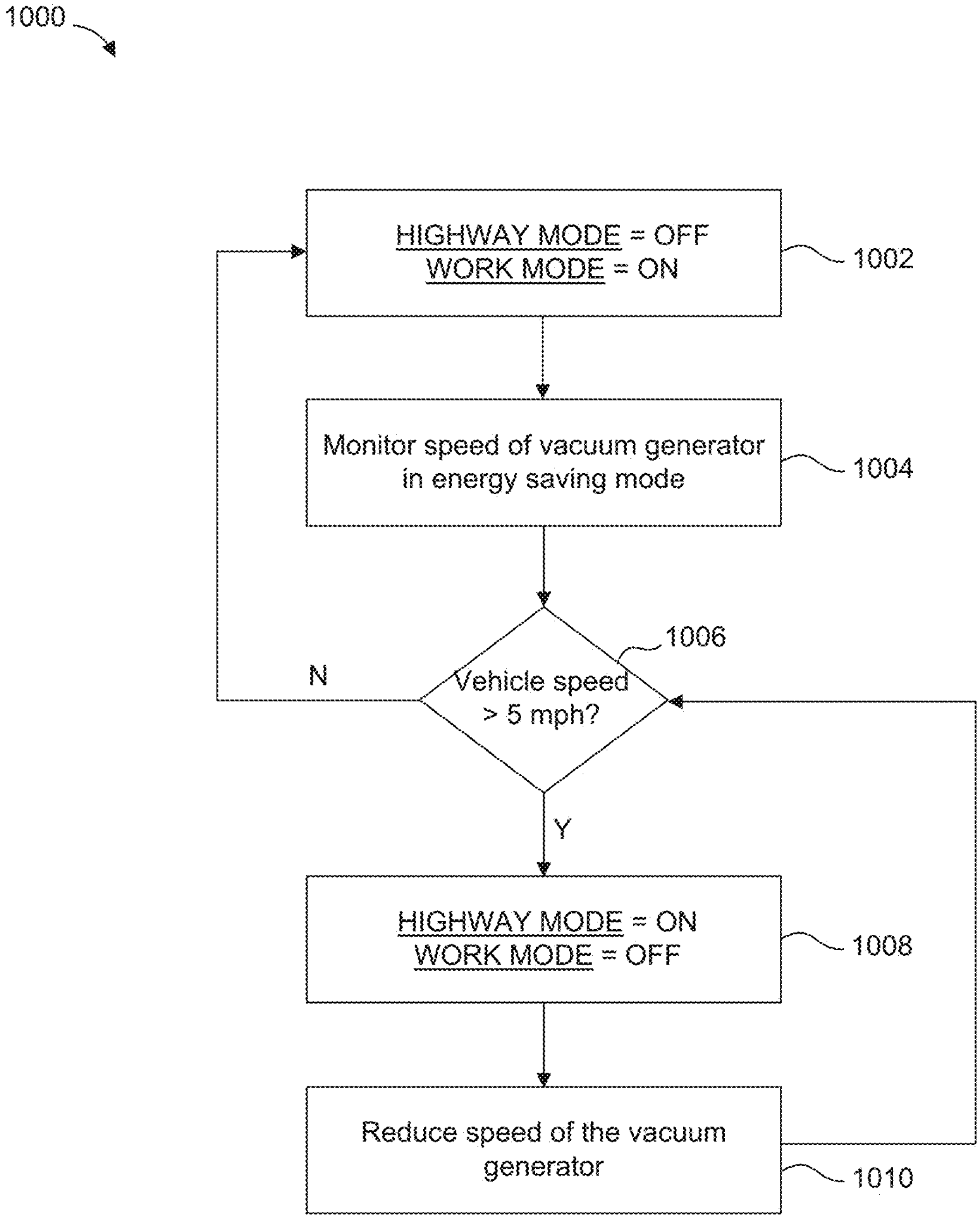
FIG. 10 is a flow chart of an example method for controlling a material collection system in an energy saving mode according to various aspects.

With reference to FIG. 10, control system 300 (FIG. 8) can control the speed of vacuum generator 232 (FIG. 5) based on the speed of vehicle 20 (FIG. 1) via method 1000. Method 1000 can include an initial step 1002 of switching off a highway mode and switching on a work mode of material collection system 100 (FIG. 1). In some aspects, work mode can be activated automatically based on one or more conditions of material collection system 100. In some aspects, an operator can trigger activation of work mode.

In some aspects, the highway mode can correspond to the first speed of vacuum generator 232 (FIG. 5) (i.e., approximately 1200 RPM or idle speed), and the work mode can correspond to the second speed of vacuum generator that is higher than the first speed (i.e., approximately 2400 RPM). In some aspects, method 1000 can include a step 1004 of monitoring the speed of vacuum generator 232 to confirm that the actual speed of vacuum generator 232 does not fall below the work mode range (i.e., the second speed), which can indicate a malfunction of vacuum generator 232. In some aspects, method 1000 can include a step 1006 of determining whether the speed of vehicle 20 (FIG. 1) is greater than approximately five mph. Control system 300 (FIG. 8) can make the determination of step 1006 based on output transmitted from speed sensor 288. If the speed of vehicle 20 is not greater than approximately five mph, then control system 300 can repeat step 1002 and step 1006. If the speed of vehicle 20 is greater than approximately five mph, control system 300 can determine that material collection operation does not need to run and thus high power is not required. Accordingly, at a step 1008, control system 300 can switch on the highway mode and switch off the work mode and, at a step 1010, reduce the speed of the vacuum generator 232 to the first speed. Finally, control system 300 can repeat steps 1006, 1008, and 1010 to monitor if the speed of vehicle 20 is maintained greater than approximately five mph.

Figure 11:
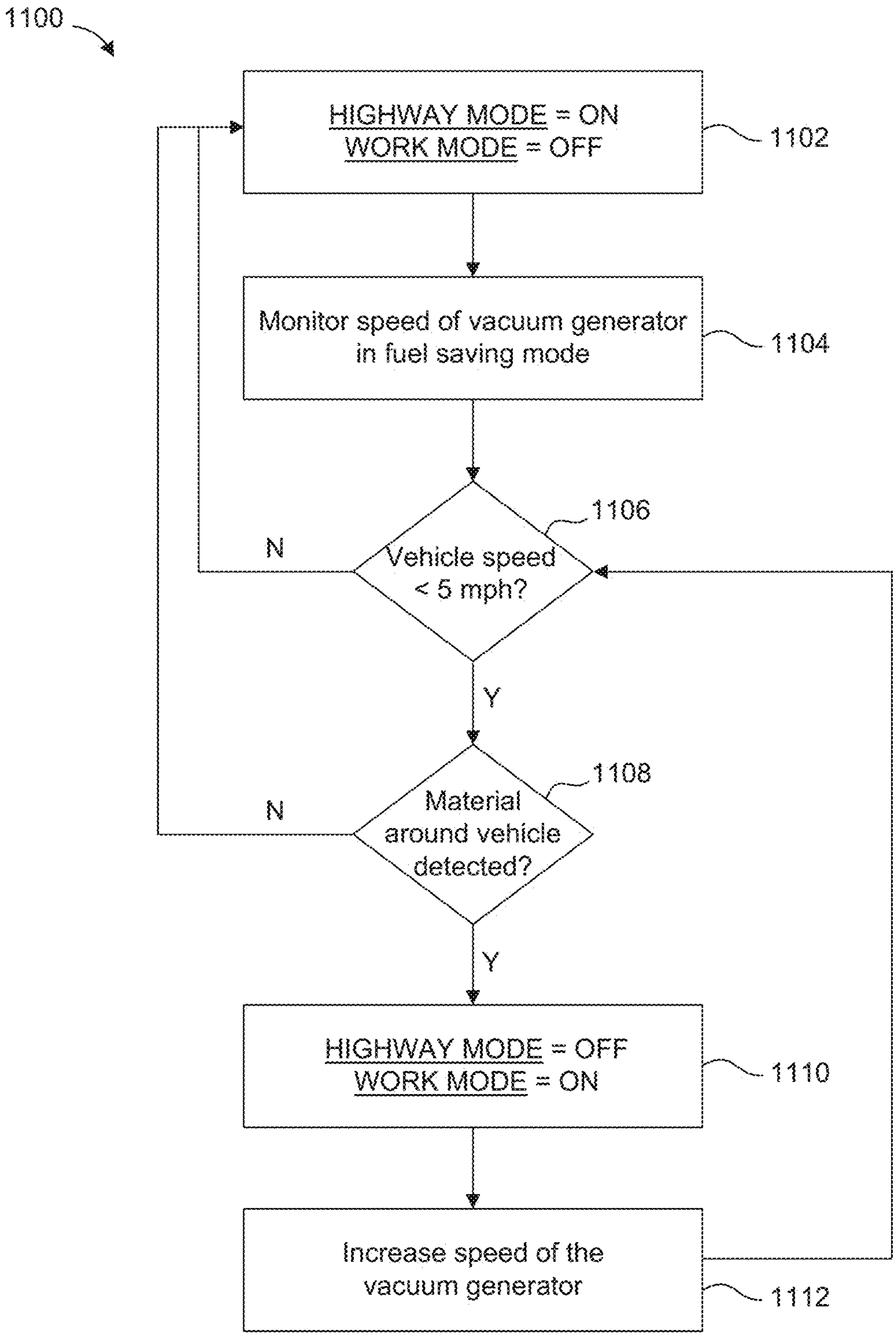
FIG. 11 is a flow chart of an example method for controlling a material collection system in an energy saving mode according to various aspects.

With reference to FIG. 11, control system 300 (FIG. 8) can control the speed of vacuum generator 232 based on the speed of vehicle 20 and material presence via method 1100. Method 1100 can include an initial step 1102 of switching on the highway mode and switching off the work mode of material collection system 100 (FIG. 1). In some aspects, highway mode can be activated automatically based on one or more conditions of material collection system 100 (FIG. 1). In some aspects, an operator can trigger activation of highway mode.

In some aspects, method 1100 can include a step 1104 of monitoring the speed of vacuum generator 232 (FIG. 5) to make sure that the actual speed of vacuum generator 232 does not exceed the range of highway mode (i.e., the first speed), which can indicate malfunction of vacuum generator 232. Method 1100 can then include a step 1106 of determining whether the speed of vehicle is less than approximately five mph (i.e., less than approximately three mph). Control system 300 (FIG. 8) can make the determination of step 1106 based on output transmitted from speed sensor 288 (FIG. 8). If the speed of vehicle 20 is not less than approximately five mph, then control system 300 can repeat step 1102 and step 1106. If the speed of vehicle 20 (FIG. 1) is less than approximately five mph, then method 1100 can include a step 1108 of determining whether material is present around vehicle 20. Control system 300 can make the determination of step 1108 based on output transmitted from material sensor 286. In some aspects, control system 300 can made the determination of step 1108 based on the amount of material detected. For example, in some aspects, there can be a threshold amount of material to trigger the material collection operation, and the threshold can be predetermined by programming instructions, such as logic 324 (FIG. 8), of control system 300 (FIG. 8). If material is not detected or the amount is below the threshold, then control system 300 can repeat steps 1102, 1104, and 1106. If material is detected and/or the amount is above the threshold, then at a step 1110, control system 300 can switch off the highway mode and switch on the work mode, and at a step 1112, control system 300 can increase the speed of the vacuum generator 232 to the second speed. Finally, control system 300 can repeat step 1106 to monitor if the speed of vehicle 20 is maintained at less than approximately five mph.

Figure 12:
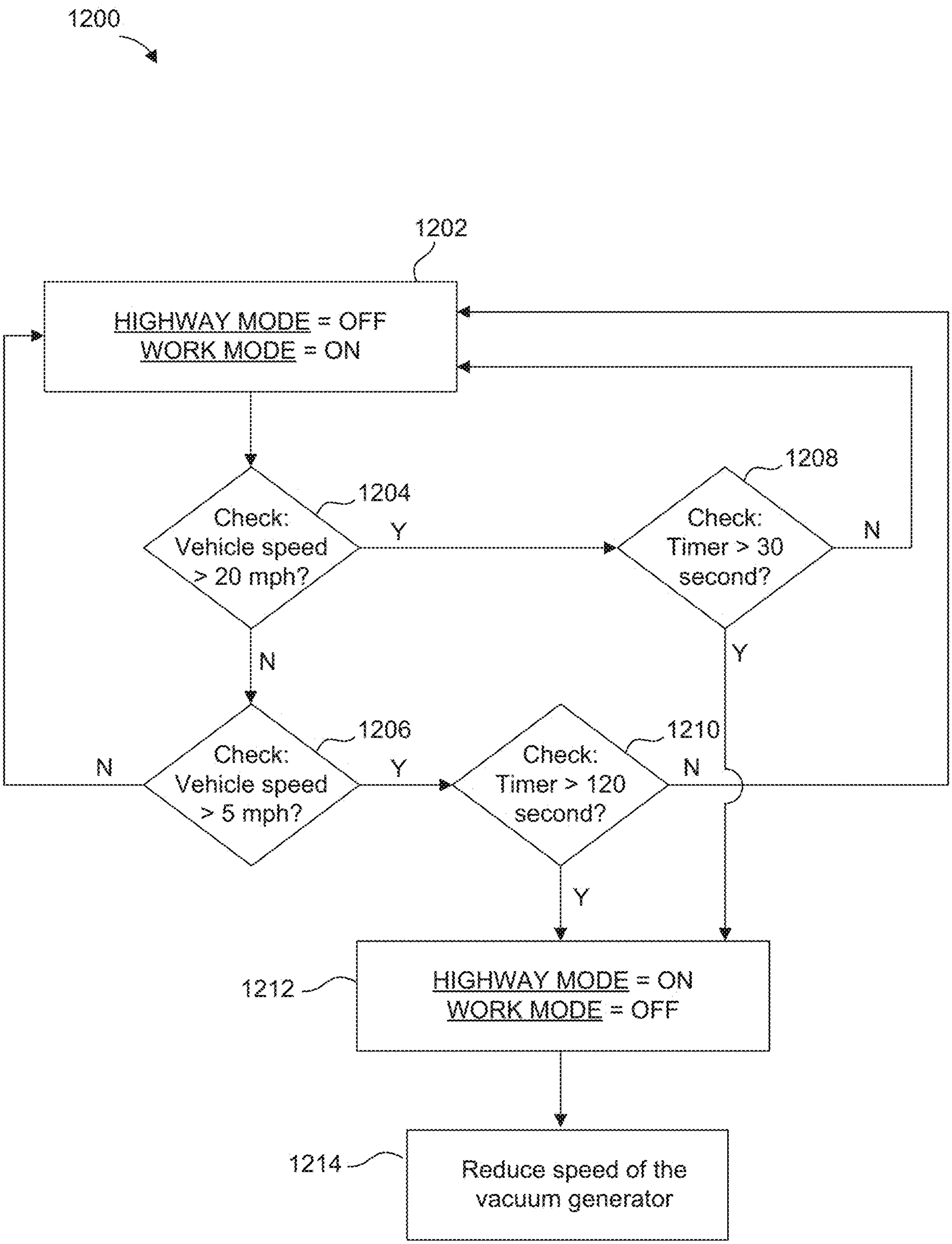
FIG. 12 is a flow chart of an example method for controlling a material collection system in an energy saving mode according to various aspects.

With reference to FIG. 12, control system 300 (FIG. 8) can control the speed of vacuum generator 232 based on the speed of vehicle 20 (FIG. 1) and a time duration via method 1200. Method 1200 can include an initial step 1202 of switching off the highway mode and switching on the work mode of material collection system 100. In some aspects, method 1200 can include a step 1204 of determining whether a speed of vehicle 20 is greater than approximately 20 mph. Control system 300 can make the determination of step 1204 based on output transmitted from speed sensor 288 (FIG. 8). If the speed of vehicle 20 is greater than approximately 20 mph, then method 1200 can include a step 1208 of determining whether vehicle 20 has traveled at greater than approximately 20 mph for more than approximately 30 seconds. In some aspects, control system 300 can make the determination of step 1208 based on output transmitted from timer 290 (FIG. 8). If timer 290 does not indicate a time duration greater than approximately 30 seconds, then control system 300 can repeat step 1202 and step 1204. If timer 290 indicates a time duration greater than approximately 30 seconds, then at a step 1212, control system 300 can switch on the highway mode and switch off the work mode, and at a step 1214, reduce speed of vacuum generator 232 to the first speed.

In some aspects, if at step 1204 the speed of vehicle 20 (FIG. 1) is not greater than approximately 20 mph, then method 1200 can include a step 1206 of determining whether the speed of vehicle 20 is greater than approximately five mph. Control system 300 (FIG. 8) can make the determination of step 704 based on output transmitted from speed sensor 288 (FIG. 8). If the speed of vehicle 20 is not greater than approximately five mph, then control system 300 can repeat step 1202 and step 1204. If the speed of vehicle 20 is greater than approximately five mph, method 1200 can include a step 1210 of determining whether vehicle 20 has traveled at greater than approximately five mph for more than approximately 120 seconds. In some aspects, control system 300 can make the determination of step 1210 based on output transmitted from timer 290 (FIG. 8). If timer 290 does not indicate a time duration greater than approximately 120 seconds, then control system 300 can repeat step 1202 and step 1204. If timer 290 indicates a time duration greater than approximately 120 seconds, then at step 1212, control system 300 can switch on the highway mode and switch off the work mode, and at step 1214, reduce speed of vacuum generator 232 (FIG. 5) to the first speed.

Figure 13:
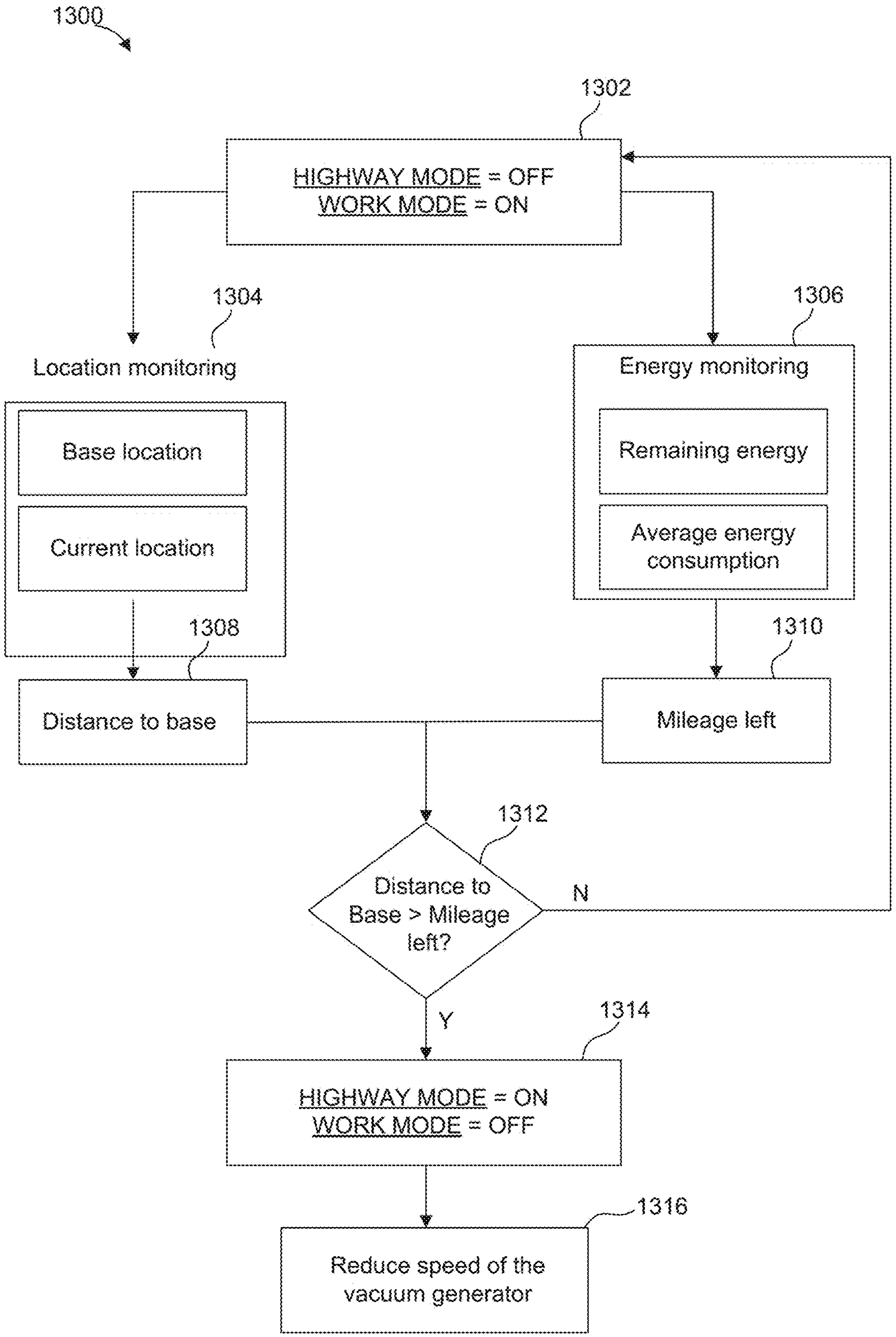
FIG. 13 is a flow chart of an example method for controlling a material collection system in an energy saving mode according to various aspects.

With reference to FIG. 13, control system 300 (FIG. 8) can control the speed of vacuum generator 232 based on the location and remaining fuel/battery level of vehicle 20 (FIG. 1) via method 1300. Method 1300 can include an initial step 1302 of switching off the highway mode and switching on the work mode of material collection system 100 (FIG. 1). In some aspects, method 1300 can include a step 1304 of monitoring the location of vehicle 20. In some aspects, step 1304 can include determining both a base location and a current location of vehicle 20. Control system 300 can determine the current location of vehicle 20 based on the output transmitted from location sensor 294 (FIG. 8). Control system 300 can determine the base location of vehicle 20 based on a data input by operator or a stored output transmitted from location sensor 294 when material collection system 100 initially started to travel. In some aspects, step 1304 can include determining more than one base locations, and each of the base locations can correspond to a fuel refill or battery recharge spot for material collection system 100. Next, at a step 1308, control system 300 can determine a distance from the current location to the base location. In the aspects where there are more than one base locations, control system 300 can the shortest distance from the current location to any of one of the base locations.

In some aspects, method 1300 can include a step 1306 of monitoring the energy of vehicle 20 (FIG. 1). The energy of vehicle 20 can be a fuel level or a battery percentage. In some aspects, step 1306 can include determining both a remaining energy of vehicle 20 and an average energy consumption of vehicle 20. Control system 300 (FIG. 8) can determine the remaining energy of vehicle 20 based on the output transmitted from location sensor 294 (FIG. 8). The average energy consumption can be a mileage per gallon of fuel or a mileage per percentage of battery. Next, at a step 1310, control system 300 can determine a mileage left to be traveled by vehicle 20 with the remaining energy.

In some aspects, method 1300 can include a step of determining whether the distance from the current location to base location, as determined in step 1308, is greater than the mileage left to be traveled by vehicle 20 (FIG. 1), as determined in step 1310. If the distance to base location is not greater than the mileage left to be traveled, then control system can repeat steps 1302-1312. If the distance to base location is greater than the mileage left to be traveled, then at a step 1314, control system 300 (FIG. 8) can switch on the highway mode and switch off the work mode, and at a step 1316, reduce speed of vacuum generator 232 (FIG. 5) to the first speed.

Figure 14:
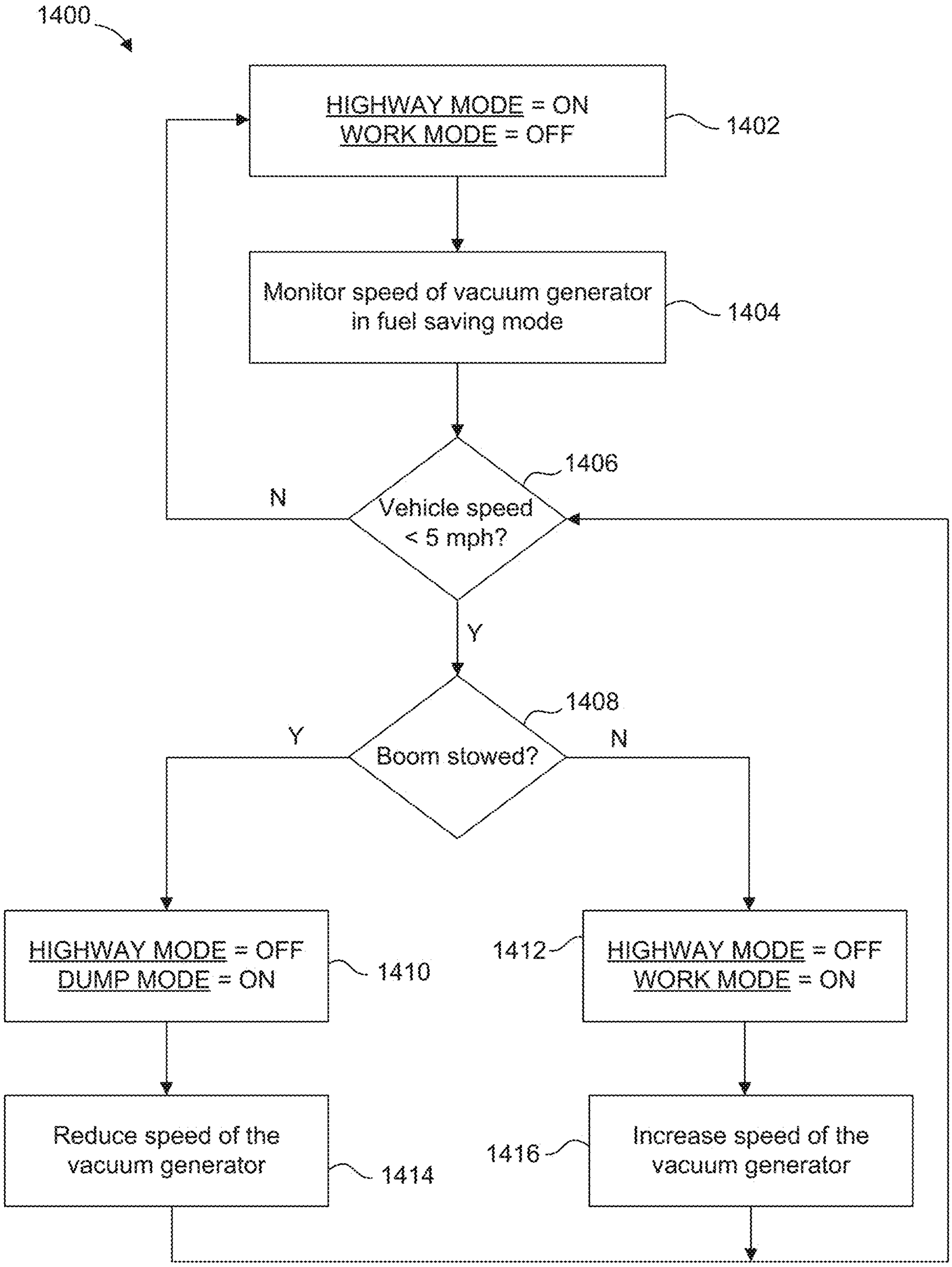
FIG. 14 is a flow chart of an example method for controlling a material collection system in an energy saving mode according to various aspects.

With reference to FIG. 14, control system 300 (FIG. 8) can control the speed of vacuum generator 232 (FIG. 5) based on the speed and the boom position of vehicle 20 (FIG. 1) via method 1400. Method 1400 can include an initial step 1402 of switching on the highway mode and switching off the work mode of material collection system 100. In some aspects, method 1400 can include a step 1404 of monitoring the speed of vacuum generator 232 to make sure that the actual speed of vacuum generator 232 does not exceed the range of the highway mode (i.e., first speed), which can indicate a malfunction of vacuum generator 232. In some aspects, method 1400 can include a step 1406 of determining whether the speed of vehicle 20 is less than approximately five mph. Control system 300 can make the determination of step 1406 based on output transmitted from speed sensor 288. If the speed of vehicle 20 is not less than approximately five mph, then control system can repeat steps 1402-1406. If the speed of vehicle 20 is less than approximately five mph, then method 1400 can include a step 1408 of determining whether boom 270 is in stowed position 40. Control system 300 can make the determination of step 1408 based on output transmitted from boom-in-rack sensor 274. If boom 270 (FIG. 6) is not in stowed position 40 (FIG. 6), then at a step 1412, control system 300 can switch off the highway mode and switch on the work mode, and at a step 1416, control system 300 can increase speed of vacuum generator 232 to the second speed. If boom 270 is in stowed position 40, then at a step 1412, control system 300 can switch off the highway mode and switch on a dump mode. In some aspects, the dump mode can correspond to a third speed less than the first speed of vacuum generator 232 (i.e., less than approximately 1200 RPM) or a shutoff of vacuum generator 232. Accordingly, at a step 1414, control system 300 can further reduce the speed of vacuum generator 232 to the third speed or shut off vacuum generator 232.

Figure 15:
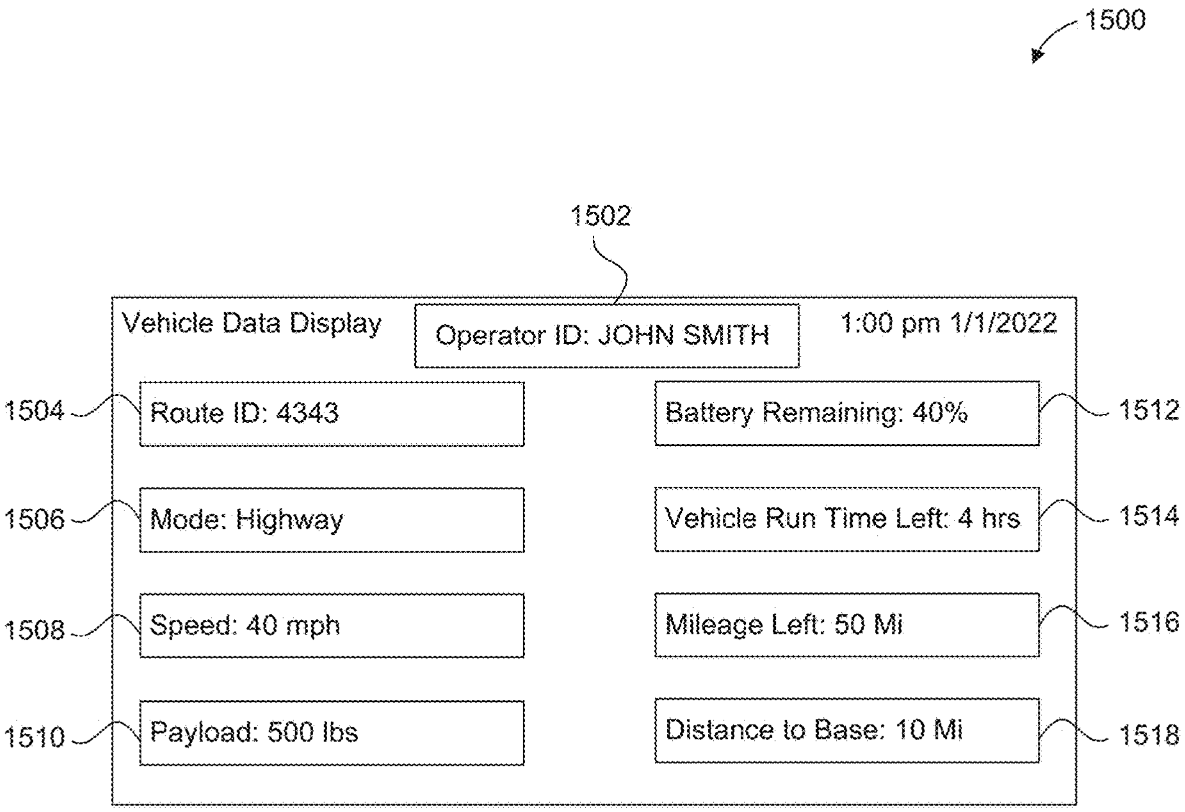
FIG. 15 is a display screen for displaying parameters of a material collection system according to various aspects.

With reference to FIG. 15, interface 332 (FIG. 8) can be a display screen 1500. In some aspects, display screen 1500 can display information about material collection system 100 relevant to an operator for making an operation decision. For example, display screen 1500 can display an operator ID 1502, an route ID 1504, a current mode 1506 of operation, a current speed 1508 of vehicle 20, a payload in weight 1510, a battery remaining 1512, a run time left 1514 based on battery remaining 1512, a mileage left 1516 similarly based on battery remaining 1512, and/or a distance to a base location 1518 among other information. Display screen 1500 can further include input features for input information, such as operator ID 1502 and route ID 1504.

In some aspects, control system 300 (FIG. 8) can also store in secondary memory 310 (FIG. 8) a predetermined routine of material collection operation including operator specific parameters, such as a work time, a work route, or a preference on operation of a material collection component 10, and/or route specific parameters, such as a terrain, a traffic pattern, or a weather condition, among other parameters. The stored routine can be run by operator ID 1502 and/or route ID 1504, which can be input by operator via interface 332 (FIG. 8). In some aspects, control system 300 under energy saving mode 326 can determine when material collection operation cannot be run and adjust the engine speed or electric motor speed or the vacuum generator speed based on the parameters in the active routine. In some aspects, control system 300 can set up a preferred operation of based on different parameters, such as the speed or direction of boom 270 movement based on operator specific parameters or the speed of fan 233 based on route specific parameters.

In some aspects, in additional to control system 300 operating material collection system 100 under energy saving mode 326, material collection system 100 can also receive an operator's command to reduce the vacuum generator speed. In some aspects, an operator can provide the command to reduce the vacuum generator speed when the operator determines that a material collection operation does not need to run. In some aspects, an operator can provide the command to reduce the vacuum generator speed via control buttons 356 and 358 or rocker switch 360 on joystick 330. In some aspects, an operator can provide the command to reduce the vacuum generator speed via an input on a steering wheel. In some aspects, an operator can provide the command to reduce the vacuum generator speed via a foot pedal or a foot switch. In some aspects, an operator can provide the command to reduce the vacuum generator speed via a voice command. In some aspects, an operator can provide the command to reduce the vacuum generator speed via a hand gesture or a body gesture read by a movement sensor.

It is to be appreciated that the Detailed Description section, and not the Summary and Abstract sections, is intended to be used to interpret the claims. The Summary and Abstract sections may set forth one or more but not all exemplary aspects of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the invention that others can, by applying knowledge within the skill of the art, readily modify and/or adapt for various applications such specific aspects, without undue experimentation, without departing from the general concept of the present invention. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary aspects, but should be defined only in accordance with the following claims and their equivalents.

What is claimed is:

1. A method for operating a material collection system, comprising:

operating a vacuum generator at a first speed, the first speed being a work mode where the vacuum generator develops an airflow to draw material into a material inlet of a conduit;

receiving, at a control system, a first signal from a sensor indicating a travel speed of the material collection system;

receiving, at the control system, a second signal from a timer indicating a time duration of the first signal;

generating, at the control system, a third signal indicating the vacuum generator is not in the work mode based on the first signal and the second signal; and controlling, by the control system, the speed of the vacuum generator to a second speed less than the first speed based on the third signal.

2. The method of claim 1, further comprising:

receiving, at the control system, a fourth signal indicating movement of a boom between a stowed position and an operating position, the boom supporting the conduit, wherein the third signal is generated based on the first signal, the second signal, and the fourth signal.

3. The method of claim 1, wherein the second speed is an idle speed of the vacuum generator.

4. The method of claim 1, wherein the second signal is received when the first signal indicates the travel speed is greater than a first threshold and less than a second threshold.

5. The method of claim 4, wherein the third signal indicating the vacuum generator is not in the work mode is generated when the second signal indicates the time duration is a first time.

6. The method of claim 5, wherein the first time is approximately 120 seconds.

7. The method of claim 5, wherein the second signal is received when the first signal indicates the travel speed is greater than the second threshold.

8. The method of claim 7, wherein the third signal indicating the vacuum generator is not in the work mode is generated when the second signal indicates the time duration is a second time less than the first time.

9. The method of claim 8, wherein the second time is approximately 30 seconds.

* * * * *